US011037225B2

(12) United States Patent
Tang et al.

(10) Patent No.: US 11,037,225 B2
(45) Date of Patent: Jun. 15, 2021

(54) GENERATING AUGMENTED REALITY VEHICLE INFORMATION FOR A VEHICLE CAPTURED BY CAMERAS IN A VEHICLE LOT

(71) Applicant: Capital One Services, LLC, McLean, VA (US)

(72) Inventors: Qiaochu Tang, The Colony, TX (US); Stephen Wylie, Carrollton, TX (US); Geoffrey Dagley, McKinney, TX (US); Olalekan Awoyemi, Prosper, TX (US); Staevan Duckworth, The Colony, TX (US); Jason Hoover, Grapevine, TX (US); Micah Price, Anna, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/394,572

(22) Filed: Apr. 25, 2019

(65) Prior Publication Data

US 2020/0342521 A1 Oct. 29, 2020

(51) Int. Cl.
*G06Q 30/06* (2012.01)
*G06T 19/00* (2011.01)
*H04N 7/18* (2006.01)

(52) U.S. Cl.
CPC ..... *G06Q 30/0643* (2013.01); *G06Q 30/0623* (2013.01); *G06T 19/006* (2013.01); *H04N 7/181* (2013.01)

(58) Field of Classification Search
CPC ......... G06Q 30/06–0645; G06Q 30/08; G06Q 50/01; G06T 19/006; H04N 7/181; G06K 9/00
See application file for complete search history.

(56) References Cited

U.S. PATENT DOCUMENTS 8,606,657 B2 * 12/2013 Chesnut ................. G06Q 30/00
705/26.61
8,614,741 B2 * 12/2013 Carlbom ................. H04N 7/181
348/143

(Continued)

OTHER PUBLICATIONS

XinReality, Virtual Reality and Augmented Reality Wiki, "NextVR", https://xinreality.com/mediawiki/index.php?title=NextVR&oldid=18133, Oct. 29, 2016, 2 pages.

*Primary Examiner* — Adam L Levine
(74) *Attorney, Agent, or Firm* — Harrity & Harrity, LLP

(57) ABSTRACT

A device receives, from multiple cameras, streaming video data associated with multiple vehicles and provides the streaming video data to a user device associated with a user. The device receives, from the user device, a request to control a first camera and provides, to the user device, first streaming video data associated with the first camera. The device receives, from the user device, a camera control command for the first camera and causes the first camera to perform an action. The device receives updated first streaming video data from the first camera and provides, to the user device, the updated first streaming video data. The device receives, from the user device, information identifying a first vehicle in the updated first streaming video data and identifies first augmented reality vehicle information associated with the first vehicle. The device provides the first augmented reality vehicle information to the user device.

20 Claims, 14 Drawing Sheets

(56) References Cited

U.S. PATENT DOCUMENTS

| | | | | |
|---|---|---|---|---|
| 8,650,147 B2* | 2/2014 | Sang | ............... | G06Q 30/06 |
| | | | | 706/50 |
| 8,860,760 B2* | 10/2014 | Chen | ............... | G09G 5/397 |
| | | | | 345/633 |
| 9,292,085 B2* | 3/2016 | Bennett | ............... | G06F 3/012 |
| 9,892,606 B2* | 2/2018 | Venetianer | ......... | G06K 9/00771 |
| 9,965,471 B2* | 5/2018 | Huston | ............... | G06T 17/00 |
| 10,191,486 B2* | 1/2019 | Baer | ............... | G01S 17/10 |
| 10,319,150 B1* | 6/2019 | Canada | ............... | G06T 19/006 |
| 10,452,924 B2* | 10/2019 | Adato | ............... | G06T 7/0002 |
| 10,523,907 B2* | 12/2019 | Shatz | ............... | H04B 10/615 |
| 2012/0194549 A1* | 8/2012 | Osterhout | ......... | G02B 27/0093 |
| | | | | 345/633 |
| 2017/0365102 A1* | 12/2017 | Huston | ............. | H04N 5/23238 |

\* cited by examiner

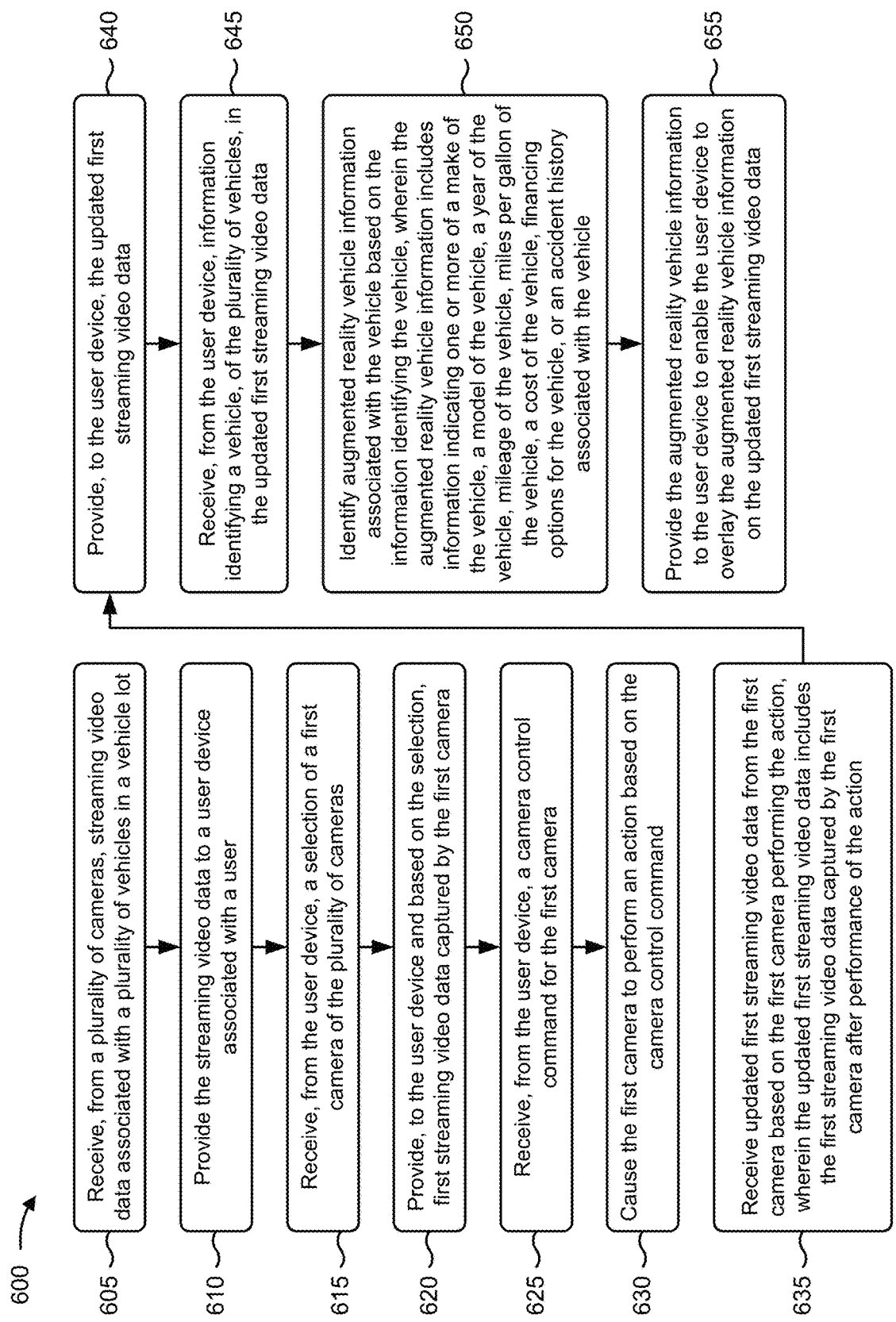

GENERATING AUGMENTED REALITY VEHICLE INFORMATION FOR A VEHICLE CAPTURED BY CAMERAS IN A VEHICLE LOT

BACKGROUND

Vehicle dealerships are one of the few remaining businesses that have yet to be replaced by e-commerce websites. This is due to customers wanting more from a vehicle-buying experience than what a simple click of a button can provide. Customers want education about the vehicles, test drives of the vehicles, all-around service for the vehicles, and/or the like. In order to sell vehicles, vehicle dealerships typically maintain large lots of new and/or used vehicles for customers to view and/or test drive.

SUMMARY

According to some implementations, a method may include receiving, from a plurality of cameras, streaming video data associated with a plurality of vehicles in a vehicle lot and providing the streaming video data to a user device associated with a user. The method may include receiving, from the user device, a request to control a first camera, of the plurality of cameras, based on a user interaction with the streaming video data and providing, to the user device and based on the request, first streaming video data associated with the first camera, wherein the first streaming video data may include the streaming video data captured by the first camera. The method may include receiving, from the user device, a camera control command for the first camera and causing the first camera to perform an action based on the camera control command. The method may include receiving updated first streaming video data from the first camera based on the first camera performing the action, wherein the updated first streaming video data may include the streaming video data captured by the first camera after performance of the action. The method may include providing, to the user device, the updated first streaming video data and receiving, from the user device, information identifying a first vehicle, of the plurality of vehicles, in the updated first streaming video data. The method may include identifying first augmented reality vehicle information associated with the first vehicle based on the information identifying the first vehicle and providing the first augmented reality vehicle information to the user device to enable the user device to overlay the first augmented reality vehicle information on the updated first streaming video data.

According to some implementations, a device may include one or more memories and one or more processors, communicatively coupled to the one or more memories, configured to receive, from a plurality of cameras, streaming video data associated with a plurality of vehicles in a vehicle lot and provide the streaming video data to a user device associated with a user. The one or more processors may receive, from the user device, a request to control a particular camera, of the plurality of cameras, based on a user interaction with the streaming video data and may provide, to the user device and based on the request, particular streaming video data associated with the particular camera, wherein the particular streaming video data may include the streaming video data captured by the particular camera. The one or more processors may receive, from the user device, a camera control command for the particular camera, wherein the camera control command may include a command to cause the particular camera to one or more of tilt, rotate, pan, or zoom. The one or more processors may cause the particular camera to one or more of tilt, rotate, pan, or zoom based on the camera control command and may receive updated particular streaming video data from the particular camera based on the particular camera one or more of tilting, rotating, panning, or zooming, wherein the updated particular streaming video data may include the streaming video data captured by the particular camera after the particular camera one or more of tilts, rotates, pans, or zooms. The one or more processors may provide, to the user device, the updated particular streaming video data and may receive, from the user device, information identifying a particular vehicle, of the plurality of vehicles, in the updated particular streaming video data. The one or more processors may identify augmented reality vehicle information associated with the particular vehicle based on the information identifying the particular vehicle and may provide the augmented reality vehicle information to the user device to enable the user device to overlay the augmented reality vehicle information on the updated particular streaming video data.

According to some implementations, a non-transitory computer-readable medium may store instructions that include one or more instructions that, when executed by one or more processors of a device, cause the one or more processors to receive, from a plurality of cameras, streaming video data associated with a plurality of vehicles in a vehicle lot and provide the streaming video data to a user device associated with a user. The one or more instructions may cause the one or more processors to receive, from the user device, a selection of a first camera of the plurality of cameras and provide, to the user device and based on the selection, first streaming video data captured by the first camera. The one or more instructions may cause the one or more processors to receive, from the user device, a camera control command for the first camera and cause the first camera to perform an action based on the camera control command. The one or more instructions may cause the one or more processors to receive updated first streaming video data from the first camera based on the first camera performing the action, wherein the updated first streaming video data may include the first streaming video data captured by the first camera after performance of the action. The one or more instructions may cause the one or more processors to provide, to the user device, the updated first streaming video data and receive, from the user device, information identifying a vehicle, of the plurality of vehicles, in the updated first streaming video data. The one or more instructions may cause the one or more processors to identify augmented reality vehicle information associated with the vehicle based on the information identifying the vehicle, wherein the augmented reality vehicle information includes information indicating one or more of a make of the vehicle, a model of the vehicle, a year of the vehicle, mileage of the vehicle, miles per gallon of the vehicle, a cost of the vehicle, financing options for the vehicle, or an accident history associated with the vehicle. The one or more instructions may cause the one or more processors to provide the augmented reality vehicle information to the user device to enable the user device to overlay the augmented reality vehicle information on the updated first streaming video data.

BRIEF DESCRIPTION OF THE DRAWINGS

FIGS. 4-6 are flow charts of example processes for utilizing machine learning to generate augmented reality vehicle information for a vehicle captured by cameras in a vehicle lot.

DETAILED DESCRIPTION

Figure 1A:
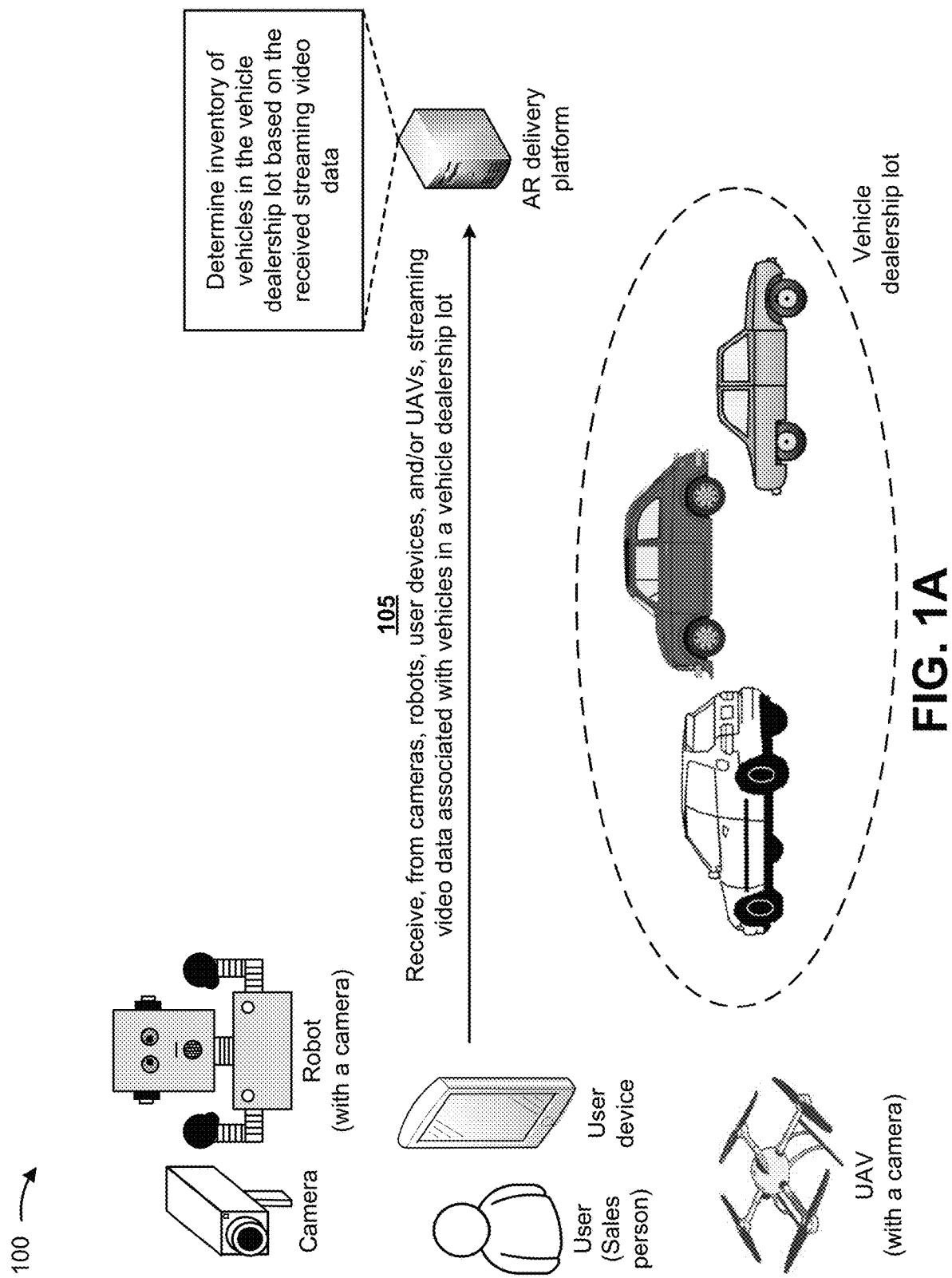
FIGS. 1A-1I are diagrams of an example implementation described herein.

The following detailed description of example implementations refers to the accompanying drawings. The same reference numbers in different drawings may identify the same or similar elements.

Shopping for a vehicle can be time consuming and many customers would like to avoid visiting a vehicle dealership if possible. Despite advances in technology, vehicle shopping still almost always includes a physical visit to a vehicle dealership lot. For many customers a physical visit to the vehicle dealership lot (e.g., a new vehicle lot, a used vehicle lot, a rental vehicle lot, and/or the like) can be difficult due to distance, disability, cost, and/or the like. Online dealerships have opened recently looking to virtually sell vehicles to customers. However, these online dealerships have been unable to replicate the in-person browsing of the dealership lot.

Some implementations described herein provide a remote content delivery platform to enable remote browsing of a vehicle lot using real-time or near real-time streaming image data of a vehicle lot captured by cameras in a vehicle lot. Some implementations described herein provide an augmented reality (AR) delivery platform that utilizes machine learning to generate augmented reality vehicle information for a vehicle captured by the cameras in a vehicle lot. For example, the AR delivery platform may receive, from multiple cameras, streaming video data associated with multiple vehicles in a vehicle lot and may provide the streaming video data to a user device associated with a user. The AR delivery platform may receive, from the user device, a request to control a first camera, of the plurality of cameras, based on a user interaction with the streaming video data and may provide, to the user device and based on the request, first streaming video data associated with the first camera, wherein the first streaming video data may include the streaming video data captured by the first camera. The AR delivery platform may receive, from the user device, a camera control command for the first camera and may cause the first camera to perform an action based on the camera control command. The AR delivery platform may receive updated first streaming video data from the first camera based on the first camera performing the action, wherein the updated first streaming video data may include the streaming video data captured by the first camera after performance of the action. The AR delivery platform may provide, to the user device, the updated first streaming video data and may receive, from the user device, information identifying a first vehicle, of the plurality of vehicles, in the updated first streaming video data. The AR delivery platform may identify first augmented reality vehicle information associated with the first vehicle based on the information identifying the first vehicle and may provide the first augmented reality vehicle information to the user device to enable the user device to overlay the first augmented reality vehicle information on the updated first streaming video data.

In some implementations, the customer may not control the plurality of cameras. In such implementations, the AR delivery platform may enable the customer (e.g., via the user device) to manipulate recently recorded streaming video data and may associate augmented reality information with the recorded streaming video data.

In this way, the AR delivery platform provides a practical and convenient technical solution for displaying inventories of new and/or used vehicles to customers. The AR delivery platform may enable a vehicle dealership to display entire inventories of new and/or used vehicles to customers, without requiring customers to travel to the vehicle dealership. By displaying entire inventories of new and/or used vehicles to customers, the AR delivery platform may conserve resources (e.g., processing resources, memory resources, transportation resources, real estate resources, and/or like) that would otherwise be wasted providing and/or managing the entire inventories of new and/or used vehicles. The AR delivery platform may also provide capabilities for enabling the vehicle dealership to display additional vehicle information overlayed in an augmented view of the dealership inventory. In some implementations, customer specific financing information for each vehicle or select vehicles may also be provided in the augmented view.

FIGS. 1A-1I are diagrams of an example implementation 100 described herein. As shown in FIG. 1A, a user device, associated with a user (e.g., a sales person associated with a vehicle dealership), a camera, a robot with a camera, an unmanned aerial vehicle (UAV) with a camera, and/or the like, may be associated with an augmented reality (AR) delivery platform. In some implementations, the user of the user device may be associated with a location of a vehicle dealership that maintains vehicles in a lot. In some implementations, there may be multiple user devices, cameras, robots with cameras, and/or UAVs with cameras associated with the vehicle dealership lot. In some implementations, the cameras may be passive cameras that capture a specific field of view of the vehicle dealership. In some implementations, the cameras may be 360-degree cameras that may be controlled to provide multiple fields of view of the vehicle dealership.

As further shown in FIG. 1A, and by reference number 105, the AR delivery platform may receive, from the cameras, robots, user devices, and/or UAVs, streaming video data associated with the vehicles in the vehicle dealership lot. In some implementations, the streaming video data may include images of the vehicles in the vehicle dealership lot; location data associated with the vehicles; location data associated with the cameras, robots, user devices, and/or UAVs; and/or the like.

As further shown in FIG. 1A, the AR delivery platform may determine an inventory of the vehicles in the vehicle dealership lot based on the streaming video data. In some implementations, the AR delivery platform may compare the vehicles identified in the streaming video data with vehicle inventory data (e.g., maintained by an inventory management system of the dealership) in order to verify that all vehicles described in the vehicle inventory data are accounted for in the streaming video data and/or to associate identified locations of the vehicles with the vehicle inventory data. In some implementations, the AR delivery platform may determine conditions associated with the vehicles identified in the streaming video data to determine whether any of the vehicles have been vandalized, moved, and/or the like. In some implementations, if a vehicle is missing from the vehicle inventory or has been vandalized, the AR delivery platform may provide, to the user device associated with the salesperson, a notification indicating that the vehicle is missing or has been vandalized.

Figure 1B:
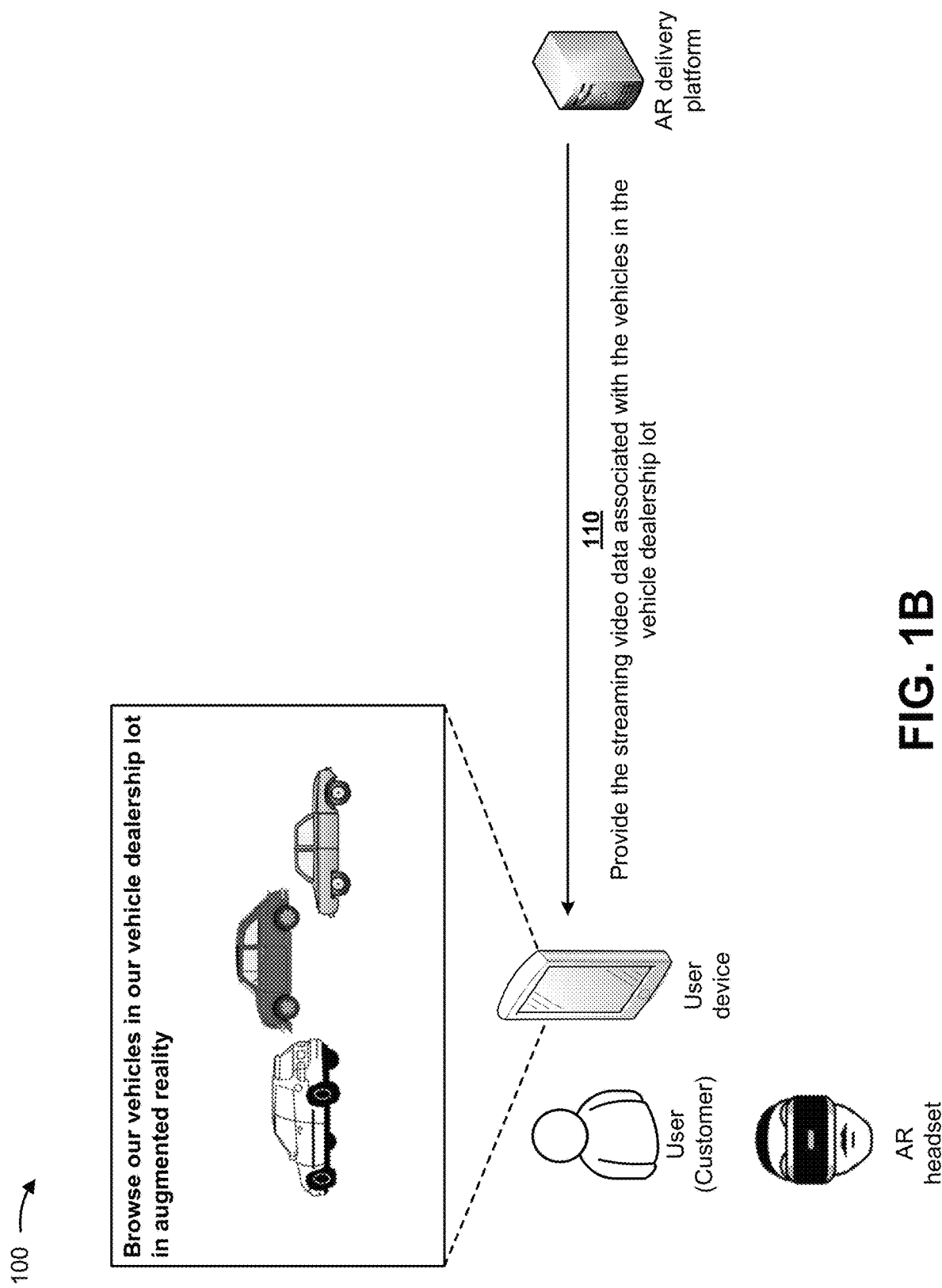

As shown in FIG. 1B, another user device associated with another user (e.g., a customer of the vehicle dealership) may access the AR delivery platform. In some implementations, the user device may include a mobile telephone, a tablet computer, a desktop computer, an AR headset, and/or the like. In some implementations, the customer may cause the user device to access a web page associated with the vehicle dealership. In such implementations, the customer may provide credentials (e.g., a username, a password, and/or the like) to access the web page.

As further shown in FIG. 1B, and by reference number 110, the AR delivery platform may provide, to the user device associated with the customer, the streaming video data associated with the vehicles in the vehicle dealership lot. In some implementations, the user device may receive the streaming video data and may display the streaming video data to the customer (e.g., the images of the vehicles in the vehicle dealership lot, information instructing the customer to browse the inventory of vehicles, and/or the like). In some implementations, the customer may utilize the user device and the streaming video data to browse the vehicles in the vehicle dealership lot. In some implementations, the streaming video data may include real-time video streams, recorded image data, recorded video streams, a combination of real-time and recorded video streams, and/or the like.

In some implementations, the customer may utilize the user device to control one or more of the cameras providing the streaming video data, to change from camera to camera at the vehicle dealership lot, and/or the like, to obtain different views of the vehicle dealership lot. In some implementations, the customer's browsing of the inventory may affect control or adjustment of one or more of the cameras providing the streaming video data, to change from camera to camera at the vehicle dealership lot, and/or the like, to provide different views of the vehicle dealership lot based on the browsing interaction.

Figure 1C:
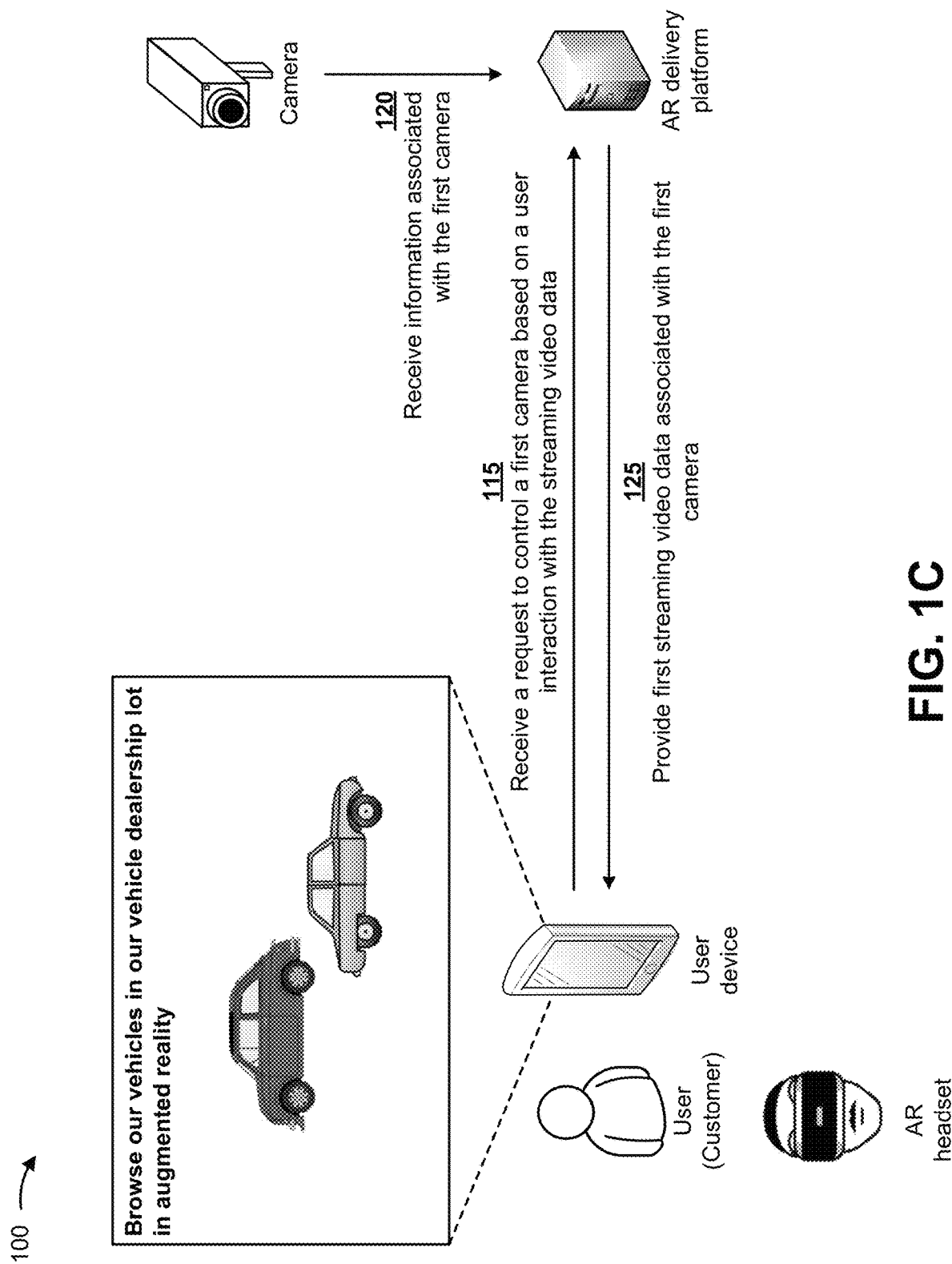

As shown in FIG. 1C, and by reference number 115, the AR delivery platform may receive, from the user device associated with the customer, a request to control a first camera based on a customer interaction with the streaming video data. In some implementations, the customer may utilize the user device to select the first camera and/or to navigate to a view in the streaming video data that is provided by the first camera. For example, the customer may interact with the streaming video data (e.g., via the user device) by navigating views of the vehicle dealership lot provided by the streaming video data.

As further shown in FIG. 1C, and by reference number 120, the AR delivery platform may receive, from the first camera, information associated with the first camera. In some implementations, the information associated with the first camera may include the streaming video data associated with the first camera (e.g., the first streaming video data), data identifying a location associated with the first camera, data identifying features of the first camera (e.g., a make, a model, a type, and/or the like), and/or the like.

As further shown in FIG. 1C, and by reference number 125, the AR delivery platform may provide, to the user device associated with the customer, the first streaming video data associated with the first camera. In some implementations, the user device may receive the first streaming video data and may display the first streaming video data to the customer (e.g., the images of the vehicles in the vehicle dealership lot captured by the first camera). In some implementations, the customer may utilize the user device to interact with the first streaming video data in order to browse the vehicles in the vehicle dealership lot captured by the first camera.

Figure 1D:
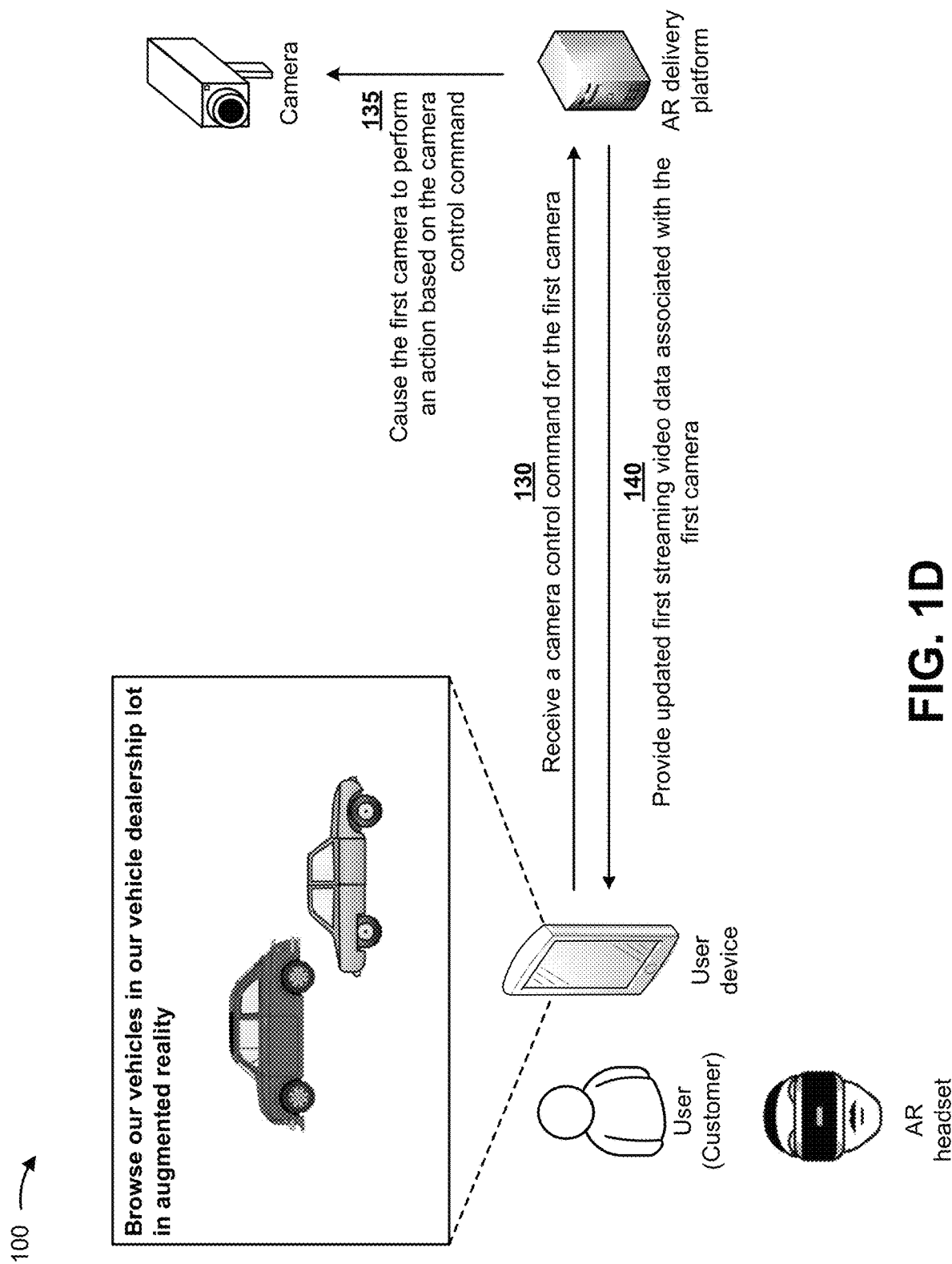

As shown in FIG. 1D, and by reference number 130, the AR delivery platform may receive, from the user device associated with the customer, a camera control command for the first camera. In some implementations, the user device may automatically generate the camera control command based on the user utilizing the user device to interact with the first streaming video data. In some implementations, the user device may generate the camera control command based an input from the user to the user device. In some implementations, the camera control command may include a command to cause the first camera to perform one or more actions, such as tilt, rotate, pan, zoom, and/or the like, in order to update the streaming video data captured by the first camera.

As further shown in FIG. 1D, and by reference number 135, the AR delivery platform may cause the first camera to perform an action based on the camera control command. In some implementations, the AR delivery platform may provide the camera control command to the first camera and the camera control command may cause the first camera to perform the action. In some implementations, the action may include the first camera tilting, rotating, panning, zooming, and/or the like. In some implementations, the AR delivery platform may receive, from the first camera, updated first streaming video data based on the first camera performing the action. For example, if the first camera zooms in on three vehicles, the updated first streaming video may include an image of the three vehicles.

As further shown in FIG. 1D, and by reference number 140, the AR delivery platform may provide, to the user device associated with the customer, the updated first streaming video data associated with the first camera. In some implementations, the user device may receive the updated first streaming video data and may display the updated first streaming video data to the customer (e.g., the images of the vehicles in the vehicle dealership lot captured by the first camera after performance of the action). In some implementations, the customer may utilize the user device to interact with the updated first streaming video data in order to further browse the vehicles in the vehicle dealership lot captured by the first camera after performance of the action.

Figure 1E:
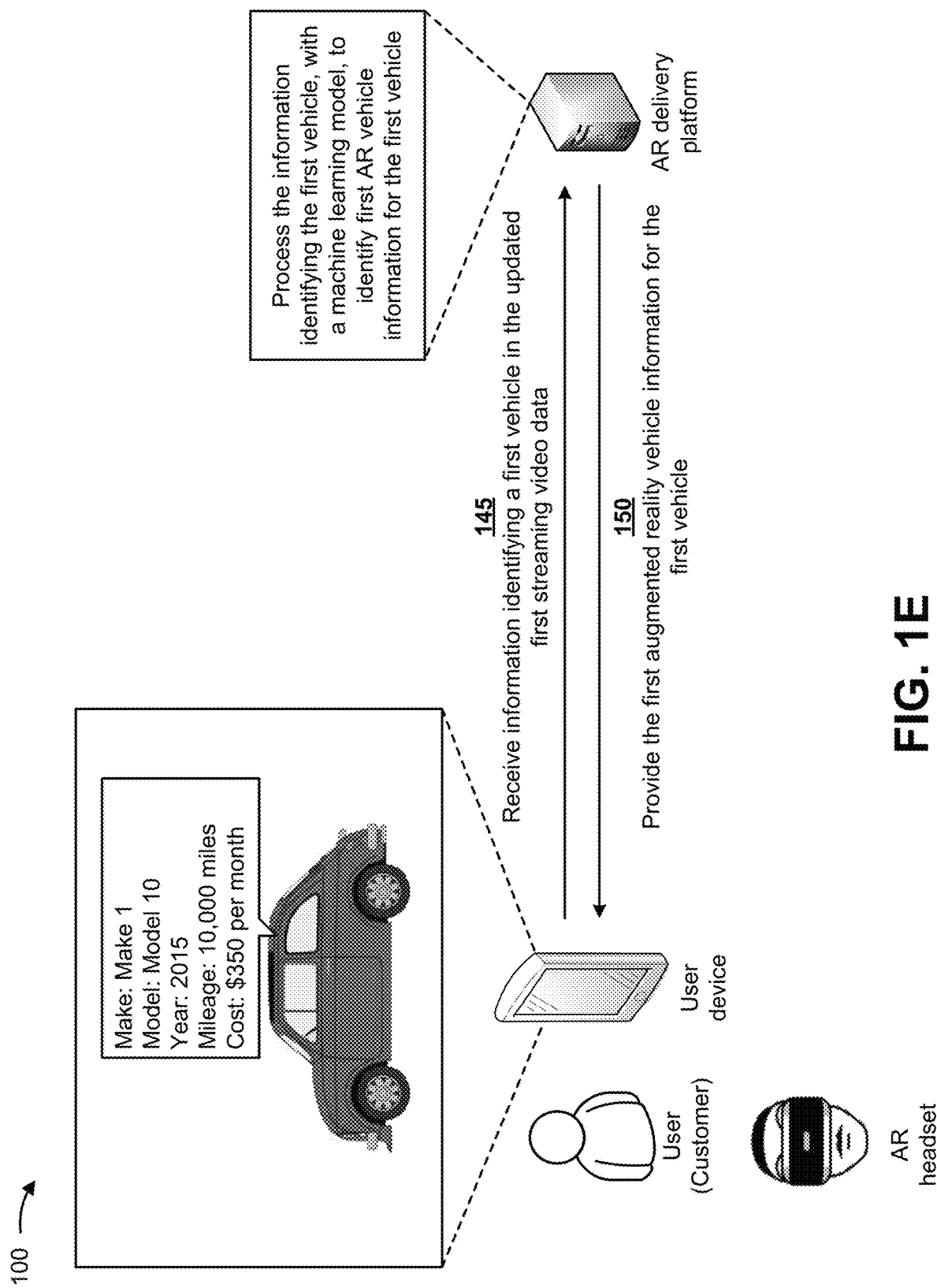

As shown in FIG. 1E, and by reference number 145, the AR delivery platform may receive, from the user device associated with the customer, information identifying a first vehicle in the updated first streaming video data. In some implementations, the customer may utilize the user device to view the first vehicle in the updated first streaming video data, and the user device may provide the information identifying the first vehicle to the AR delivery platform based on the customer viewing the first vehicle in the updated first streaming video data. In some implementations, the information identifying the first vehicle may include an image of the first vehicle as seen by the customer via the user device. In some implementations, the customer may utilize the user device to select a portion of the image of the first vehicle, to point a reticle at the first vehicle and to select a selection mechanism (e.g., a button, an icon, etc.), and/or the like. In some implementations, the AR delivery platform may identify vehicles in a field of view of image data, as the image data is provided to the user device. In some implementations, the user device and/or the AR delivery platform may process incoming image data, with a vehicle recognition model, to recognize vehicles in the image data.

In some implementations, the AR delivery platform may perform image processing on the image of the first vehicle to identify a first vehicle type (e.g., a first vehicle make, model, year, and/or the like) associated with the first vehicle. In some implementations, the AR delivery platform may utilize an image analysis, as an image processing technique, to extract meaningful information (e.g., a shape of the first vehicle, text or logos indicating a make and/or a model of the first vehicle, and/or the like) from the image of the first vehicle. In some implementations, the image processing technique may include two-dimensional (2D) object recognition, three-dimensional (3D) object recognition, image segmentation, motion detection, video tracking, machine learning techniques (e.g., Viola-Jones object detection framework based on Haar features, scale-invariant feature transform (SIFT), histogram of oriented gradients (HOG) features, and/or the like), deep learning techniques (e.g., region proposals, single shot multibox detector (SSD), you only look once (YOLO), and/or the like), and/or the like.

In some implementations, the first vehicle may include a vehicle type identification mechanism (e.g., a barcode, a serial number, a matrix code, a QR code, a vehicle identification number (VIN) decoder, and/or the like) that may be captured by the user device and may provide an indication of the vehicle type associated with the first vehicle. The AR delivery platform may identify the vehicle identification mechanism based on the camera feed received from the user device rather than based on a user action. In some implementations, the AR delivery platform may store images captured by robots, drones, etc. and may identify the vehicle identification mechanism from the stored images.

In some implementations, the AR delivery platform may process the information identifying the first vehicle, with a machine learning model, to identify the vehicle type associated with the first vehicle. In some implementations, the machine learning model may include a pattern recognition model that identifies the vehicle type associated with the first vehicle. For example, the machine learning model may analyze the image of the first vehicle to extract meaningful information (e.g., a shape of the first vehicle, text or logos indicating a make and/or a model of the first vehicle, and/or the like) from the image, or may receive the extracted information as a result of the image processing technique. The machine learning model may compare the extracted information with information indicating vehicle types associated with a variety of vehicles and may match the extracted information with at least one of the vehicle types associated with the variety of vehicles.

As further shown in FIG. 1E, the AR delivery platform may process the information identifying the first vehicle, with a machine learning model, to identify first AR vehicle information for the first vehicle. In some implementations, the machine learning model may include a pattern recognition model that identifies the first AR vehicle information for the first vehicle. In some implementations, the first AR vehicle information may include AR information (e.g., to be rendered in AR by the user device associated with the customer) identifying a make of the first vehicle (e.g., "Make 1"), a model of the first vehicle (e.g., "Model 10"), a year of the first vehicle (e.g., "2015"), a mileage of the first vehicle (e.g., "10,000 miles"), a monthly payment for the first vehicle that is personalized to the customer based on the customer's financial information (e.g., "$350 per month"), a price of the vehicle that is personalized to the customer based on the customer's financial information (e.g., credit score, salary, pre-qualification information, and/or the like), and/or the like. In some implementations, the first AR vehicle information may include augmented reality (AR) vehicle information that may be used to associate the vehicle information with the image of the first vehicle.

In some implementations, the AR delivery platform may perform a training operation on the machine learning model with historical vehicle information associated with a variety of vehicles. In some implementations, the historical vehicle information may include information indicating vehicle shapes, distinguishing vehicle features, logos provided on vehicles, text provided on vehicles, makes of vehicles, models of vehicles, years of vehicles, mileages of vehicles, costs of vehicles, and/or the like.

The AR delivery platform may separate the historical vehicle information into a training set, a validation set, a test set, and/or the like. In some implementations, the AR delivery platform may train the machine learning model using, for example, an unsupervised training procedure and based on the historical vehicle information. For example, the AR delivery platform may perform dimensionality reduction to reduce the historical vehicle information to a minimum feature set, thereby reducing resources (e.g., processing resources, memory resources, and/or the like) required to train the machine learning model, and may apply a classification technique to the minimum feature set.

In some implementations, the AR delivery platform may use a logistic regression classification technique to determine a categorical outcome (e.g., that the historical vehicle information indicates that a particular vehicle type is associated with a particular shape, particular features, and/or the like). Additionally, or alternatively, the AR delivery platform may use a naïve Bayesian classifier technique. In this case, the AR delivery platform may perform binary recursive partitioning to split the historical vehicle information into partitions and/or branches and use the partitions and/or branches to perform predictions (e.g., that the historical vehicle information indicates that a particular vehicle type is associated with a particular shape, particular features, and/or the like). Based on using recursive partitioning, the AR delivery platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the AR delivery platform may use a support vector machine (SVM) classifier technique to generate a non-linear boundary between data points in the training set. In this case, the non-linear boundary is used to classify test data into a particular class.

Additionally, or alternatively, the AR delivery platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the AR delivery platform may use one or more other model training techniques, such as a neural network technique, a latent semantic indexing technique, and/or the like. For example, the AR delivery platform may perform an artificial neural network processing technique (e.g., using a two-layer feedforward neural network architecture, a three-layer feedforward neural network architecture, and/or the like) to perform pattern recognition with regard to patterns of the historical vehicle information. In this case, using the artificial neural network processing technique may improve an accuracy of the trained machine learning model generated by the AR delivery platform by being more robust to noisy, imprecise, or incomplete data, and by enabling the AR delivery platform to detect patterns and/or trends undetectable to human analysts or systems using less complex techniques.

In some implementations, the AR delivery platform may utilize the machine learning model to determine a make/model, a color, trim/vehicle features about a vehicle (e.g., information about the vehicle that can be determined from an external image). The AR delivery platform may cross-reference the vehicle information with a vehicle inventory database of the dealership to identify the specific vehicle and to identify additional information to be displayed in augmented reality (e.g., mileage, miles per gallon, price, etc.). If the AR delivery platform is unable to identify the specific vehicle based on the vehicle inventory database, the AR delivery platform may identify the specific vehicle based on knowledge of where vehicles are parked. The AR delivery platform may utilize information associated with a camera (e.g., a location of the camera, an angle of the camera, images of a parking spot, etc.) to identify the specific vehicle.

In some implementations, the AR delivery platform may utilize the camera to uniquely identify each vehicle based on a vehicle identification mechanism (e.g., a QR code, a barcode, a VIN decoder, etc.). The AR delivery platform may cross-reference the identified vehicle with the vehicle inventory database to identify the identified vehicle and to identify additional information to be displayed in augmented reality. In such implementations, the AR delivery platform may utilize computer vision to identify the vehicle and to identify the additional information to be displayed in augmented reality.

As further shown in FIG. 1E, and by reference number 150, the AR delivery platform may provide, to the user device associated with the customer, the first AR vehicle information for the first vehicle. The user device may receive the first AR vehicle information and may display the first AR vehicle information to the customer via a user interface. For example, the user interface may include vehicle information indicating that the first vehicle make is a Make 1, that the first vehicle model is a Model 1, that the first vehicle was manufactured in 2015, that the mileage of the first vehicle is 10,000 miles, and that the cost of the first vehicle is $350 per month. In some implementations, the first AR vehicle information may be rendered, by the user device associated with the customer, as a balloon or a billboard over the actual image of the first vehicle.

Figure 1F:
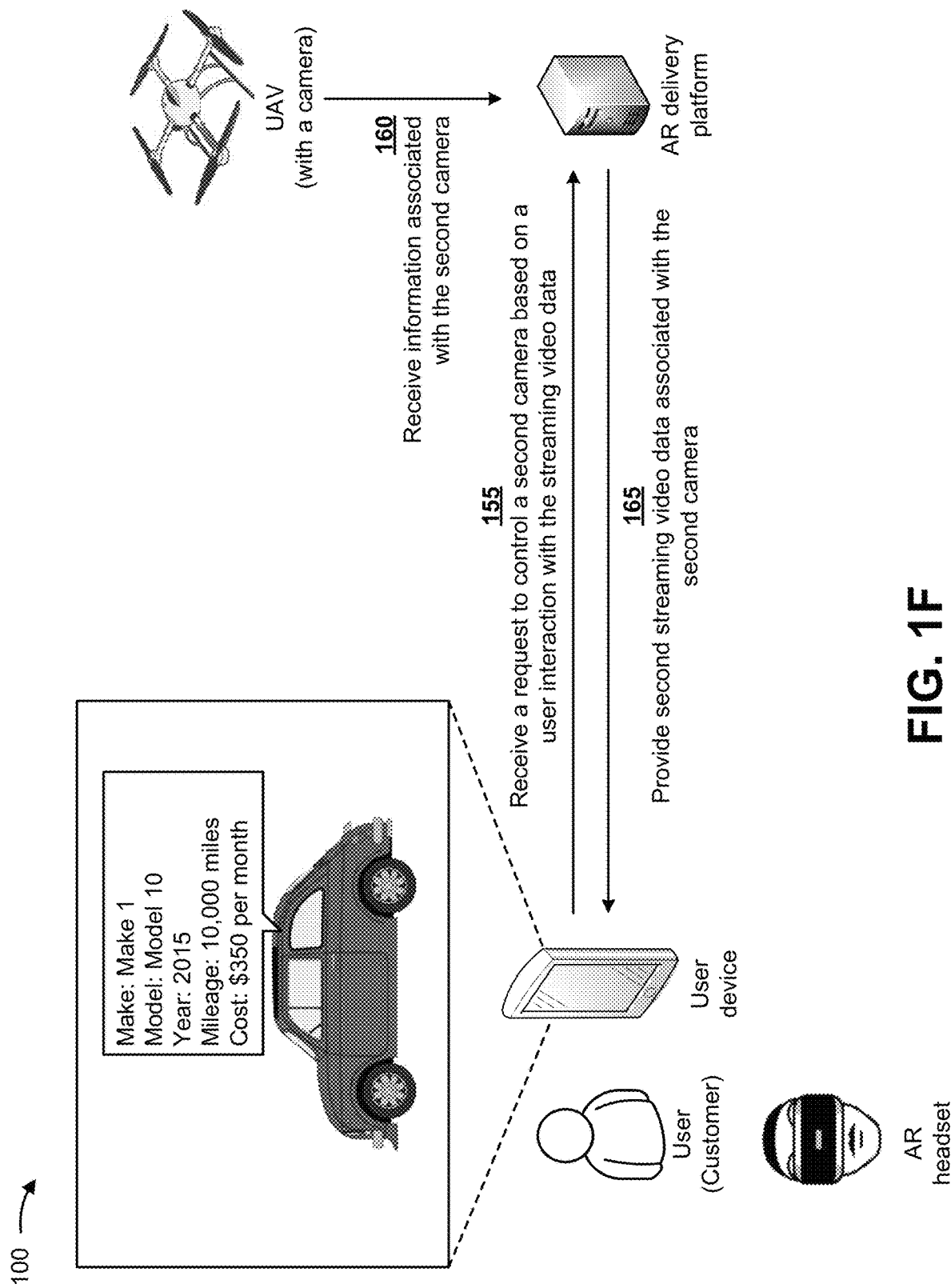

As shown in FIG. 1F, and by reference number 155, the AR delivery platform may receive, from the user device associated with the customer, a request to control a second camera based on a customer interaction with the streaming video data. In some implementations, the customer may utilize the user device to select the second camera and/or to navigate to a view in the streaming video data that is provided by the second camera. For example, the customer may interact with the streaming video data (e.g., via the user device) by navigating to views of the vehicle dealership lot provided by the streaming video data.

As further shown in FIG. 1F, and by reference number 160, the AR delivery platform may receive, from the second camera, information associated with the second camera. In some implementations, the information associated with the second camera may include the streaming video data associated with the second camera (e.g., the second streaming video data), data identifying a location associated with the second camera, data identifying features of the second camera (e.g., a make, a model, a type, and/or the like), and/or the like.

As further shown in FIG. 1F, and by reference number 165, the AR delivery platform may provide, to the user device associated with the customer, the second streaming video data associated with the second camera. In some implementations, the user device may receive the second streaming video data and may display the second streaming video data to the customer (e.g., the images of the vehicles in the vehicle dealership lot captured by the second camera). In some implementations, the customer may utilize the user device to interact with the second streaming video data in order to browse the vehicles in the vehicle dealership lot captured by the second camera.

Figure 1G:
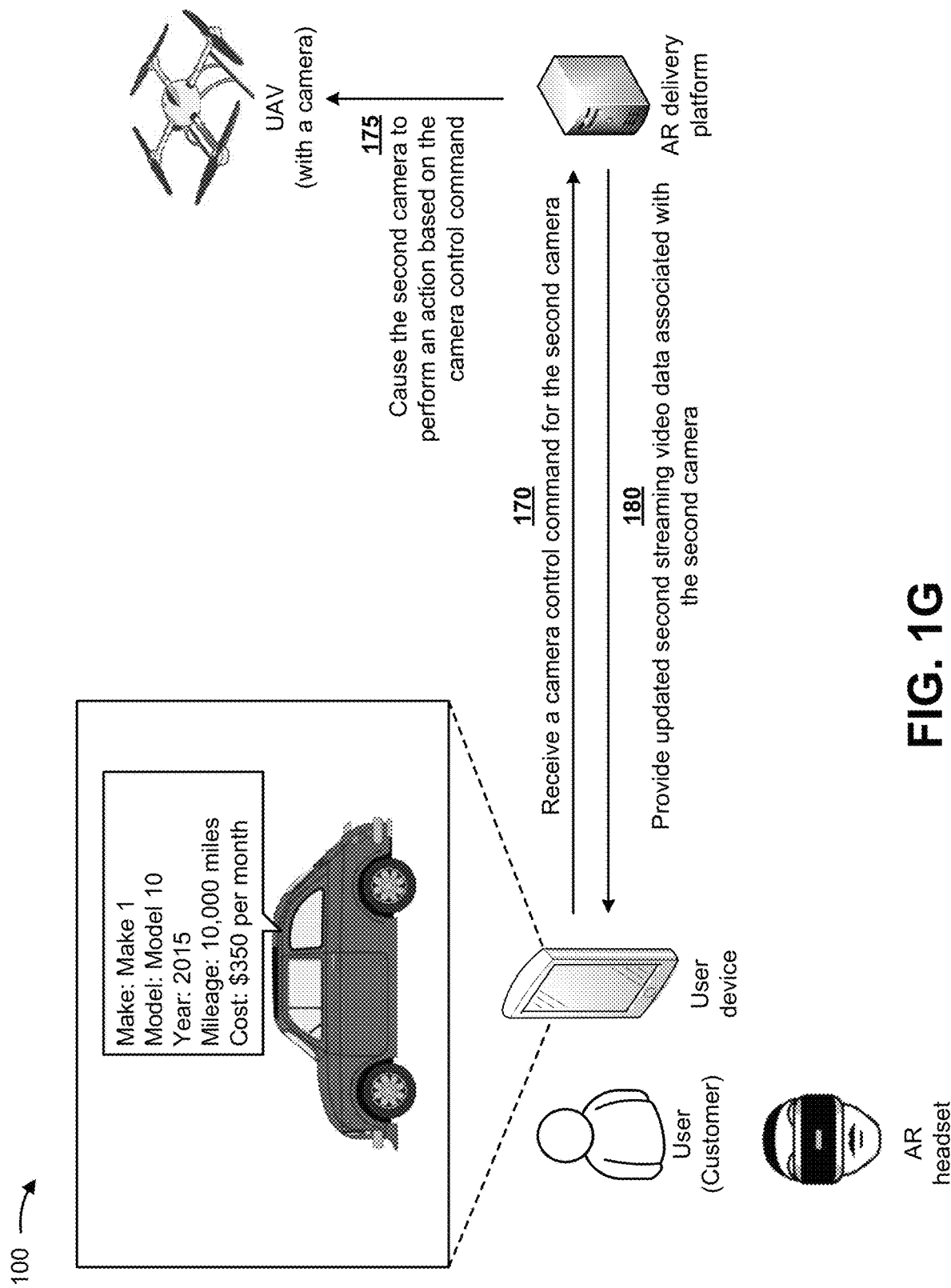

As shown in FIG. 1G, and by reference number 170, the AR delivery platform may receive, from the user device associated with the customer, a camera control command for the second camera. In some implementations, the user device may automatically generate the camera control command based on the user utilizing the user device to interact with the second streaming video data. In some implementations, the user device may generate the camera control command based an input from the user to the user device. In some implementations, the camera control command may include a command to cause the second camera to perform one or more actions, such as tilt, rotate, pan, zoom, and/or the like, in order to update the streaming video data captured by the second camera.

As further shown in FIG. 1G, and by reference number 175, the AR delivery platform may cause the second camera to perform an action based on the camera control command. In some implementations, the AR delivery platform may provide the camera control command to the second camera and the camera control command may cause the second camera to perform the action. In some implementations, the action may include the second camera tilting, rotating, panning, zooming, and/or the like. In some implementations, the AR delivery platform may receive, from the second camera, updated second streaming video data based on the second camera performing the action. For example, if the second camera tilts to capture two vehicles, the updated second streaming video may include an image of the two vehicles.

As further shown in FIG. 1G, and by reference number 180, the AR delivery platform may provide, to the user device associated with the customer, the updated second streaming video data associated with the second camera. In some implementations, the user device may receive the updated second streaming video data and may display the updated second streaming video data (e.g., the images of the vehicles in the vehicle dealership lot captured by the second camera after performance of the action) to the customer. In some implementations, the customer may utilize the user device to interact with the updated second streaming video data in order to further browse the vehicles in the vehicle dealership lot captured by the second camera after performance of the action. In some implementations, the performance of the action may cause the first camera and/or the second camera to capture two or more vehicles, may cause the first camera to capture multiple vehicles and the second camera to capture a particular vehicle, and/or the like.

Figure 1H:
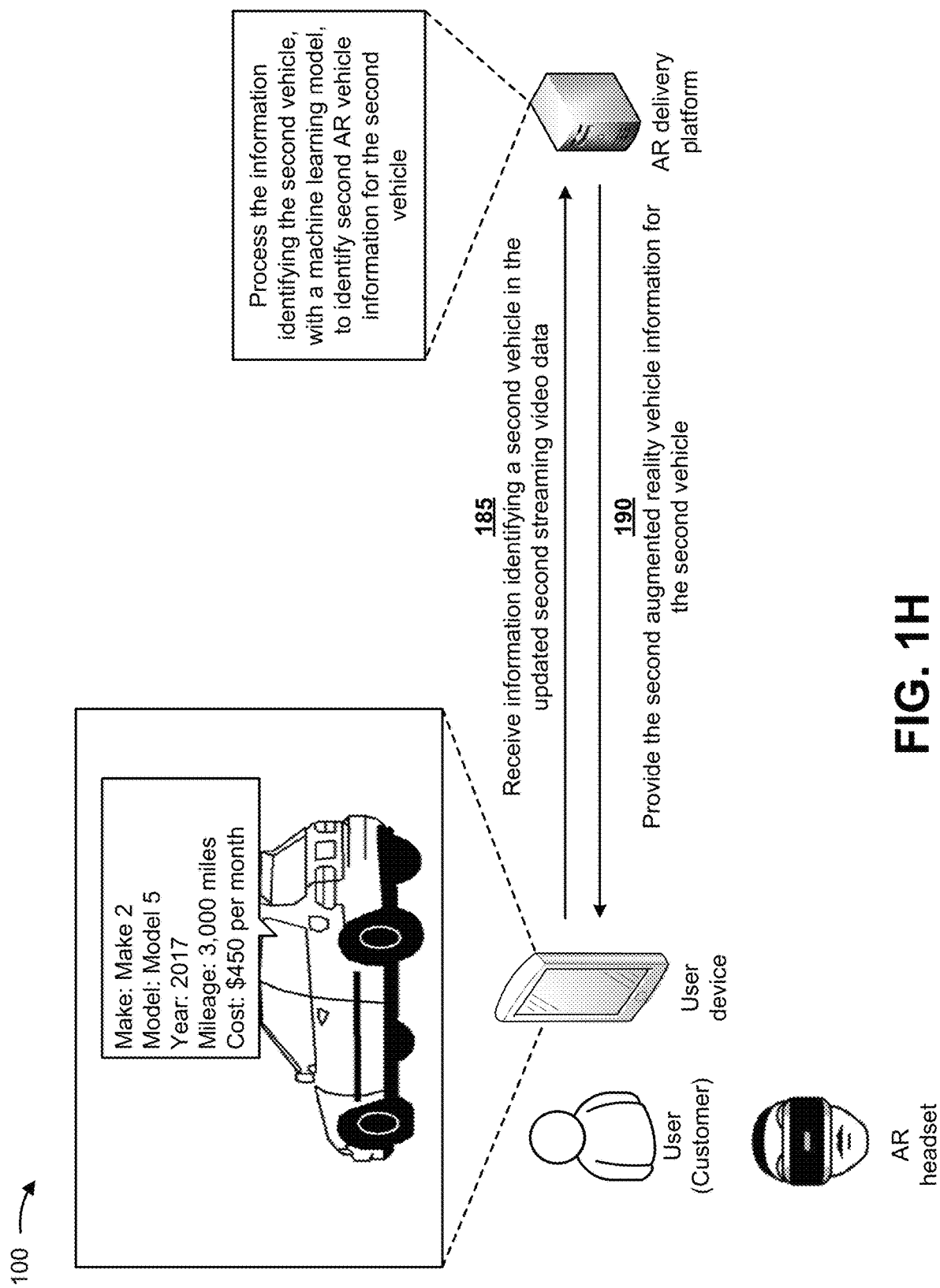

As shown in FIG. 1H, and by reference number 185, the AR delivery platform may receive, from the user device associated with the customer, information identifying a second vehicle in the updated second streaming video data. In some implementations, the customer may utilize the user device to view the second vehicle in the updated second streaming video data, and the user device may provide the information identifying the second vehicle to the AR delivery platform based on the customer viewing the second vehicle in the updated second streaming video data. In some implementations, the information identifying the second vehicle may include an image of the second vehicle as seen by the customer via the user device.

In some implementations, the AR delivery platform may perform image processing on the image of the second vehicle to identify a second vehicle type (e.g., a second vehicle make, model, year, and/or the like) associated with the second vehicle, as described above in connection with FIG. 1E. In some implementations, the second vehicle may include a vehicle type identification mechanism (e.g., a barcode, a serial number, a matrix code, a QR code, a VIN decoder, and/or the like) that may be captured by the user device and may provide an indication of the vehicle type associated with the second vehicle. In some implementations, the AR delivery platform may process the information identifying the second vehicle, with a machine learning model, to identify the vehicle type associated with the second vehicle, as described above in connection with FIG. 1E. The AR delivery platform may identify the vehicle identification mechanism based on the camera feed received from the user device rather than based on a user action. In some implementations, the AR delivery platform may store images captured by robots, drones, etc. and may identify the vehicle identification mechanism from the stored images.

As further shown in FIG. 1H, the AR delivery platform may process the information identifying the second vehicle, with a machine learning model, to identify second AR vehicle information for the second vehicle. In some implementations, the machine learning model may include a pattern recognition model that identifies the second AR vehicle information for the second vehicle. In some implementations, the second AR vehicle information may include AR information (e.g., to be rendered in AR by the user device associated with the customer) identifying a make of the second vehicle (e.g., "Make 2"), a model of the second vehicle (e.g., "Model 5"), a year of the second vehicle (e.g., "2017"), a mileage of the second vehicle (e.g., "3,000 miles"), a monthly cost of the second vehicle (e.g., "$450 per month"), and/or the like. In some implementations, the second AR vehicle information may include augmented reality (AR) vehicle information that may be used to associate the vehicle information with the image of the second vehicle. In some implementations, the AR information may include a billboard provided for multiple vehicles identified in an image. For example, if the image includes ten pickup trucks, the billboard may be displayed above the pickup trucks and may include differentiating information important to the customer to enable the customer to drill down through the information (e.g., the billboard may include mileages associated with the pickup trucks, monthly payments for the pickup trucks, and/or the like, and the customer may zoom in on the pickup truck with a lowest monthly payment).

As further shown in FIG. 1H, and by reference number 190, the AR delivery platform may provide, to the user device associated with the customer, the second AR vehicle information for the second vehicle. The user device may receive the second AR vehicle information and may display the second AR vehicle information to the customer via a user interface. For example, the user interface may include vehicle information indicating that the second vehicle make is a Make 2, that the second vehicle model is a Model 5, that the second vehicle was manufactured in 2017, that the mileage of the second vehicle is 3,000 miles, and that the cost of the second vehicle is $450 per month. In some implementations, the second AR vehicle information may be rendered, by the user device associated with the customer, as a balloon or a billboard over the actual image of the second vehicle.

Figure 1I:
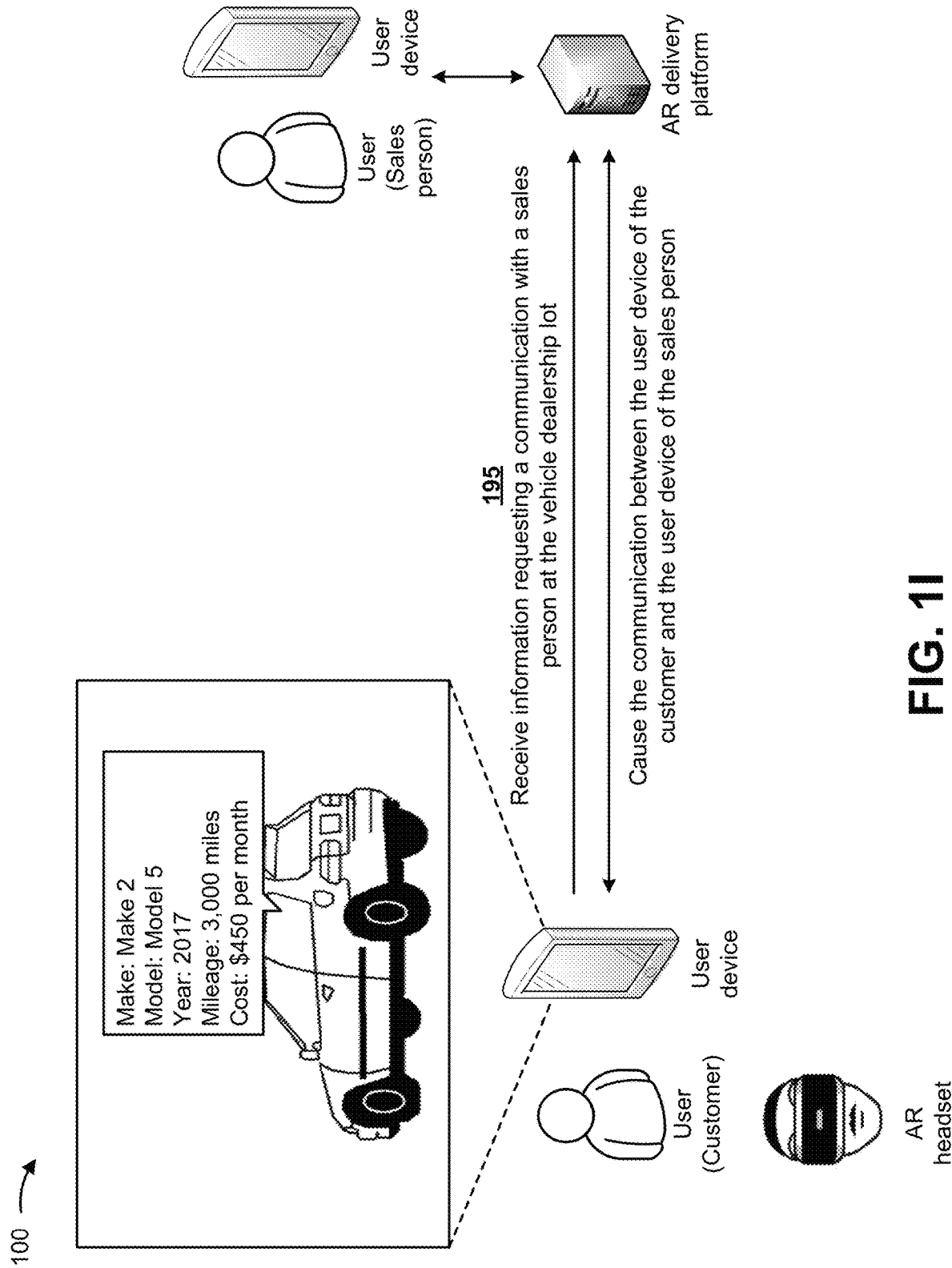

As shown in FIG. 1I, and by reference number 195, the AR delivery platform may receive, from the user device associated with the customer, information requesting a communication (e.g., a telephone call, a text messaging session, an email, a chat session, and/or the like) with a sales person at the vehicle dealership lot. In some implementations, the sales person may be associated with a user device. As further shown in FIG. 1I, the AR delivery platform may cause the communication between the user device of the customer and the user device of the sales person to be established. In this way, the AR delivery platform may enable the customer to speak with the sales person to obtain further information about a vehicle of interest to the customer.

In some implementations, the AR delivery platform may enable customers with disabilities (e.g., which prevent them from easily visiting a dealership lot) to visit a dealership lot in augmented reality. In some implementations, the customer may be physically located at the vehicle dealership lot and may be associated with a shopping partner who is not physically located at the vehicle dealership lot. In such implementations, the AR delivery platform may enable the shopping partner to use AR and to see vehicles that the customer is viewing. The shopping partner may provide opinions about these vehicles to the customer. In some implementations, a disabled person may be associated with a shopping partner who is physically located at the vehicle dealership lot. In such implementations, the AR delivery platform may enable the disabled person to use AR and to see vehicles that the shopping partner is viewing. The disabled person may communicate with the shopping partner and may instruct the shopping partner to perform certain actions (e.g., view this vehicle, go see a salesperson, and/or the like).

In some implementations, the AR delivery platform may overlay the vehicle information in a "street view" and the vehicle information may include a dealer price, personalized vehicle information (e.g., a personal annual percentage rate (APR), a personal monthly payment based on the personal APR, and/or the like) if the customer has provided pre-qualification information, and/or the like. In some implementations, the AR delivery platform may enable the customer to remotely browse dealership vehicles, may provide the personalized vehicle information in a user interface to the customer, and may provide augmented reality details of a vehicle and personalized financing information in the user interface.

In this way, several different stages of the process for generating augmented reality vehicle information for a vehicle captured by cameras in a vehicle lot are automated through machine learning, thereby removing human subjectivity and waste from those stages of the process, and improving speed and efficiency of the process and conserving computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that utilizes machine learning to generate augmented reality vehicle information for a vehicle captured by cameras in a vehicle lot. Finally, automating the process for generating augmented reality vehicle information for a vehicle captured by cameras in a vehicle lot via machine learning conserves computing resources (e.g., processing resources, memory resources, and/or the like) that would otherwise be wasted attempting to provide, sell, and/or manage the entire inventories of new and/or used vehicles.

As indicated above, FIGS. 1A-1I are provided merely as examples. Other examples may differ from what is described with regard to FIGS. 1A-1I.

Figure 2:
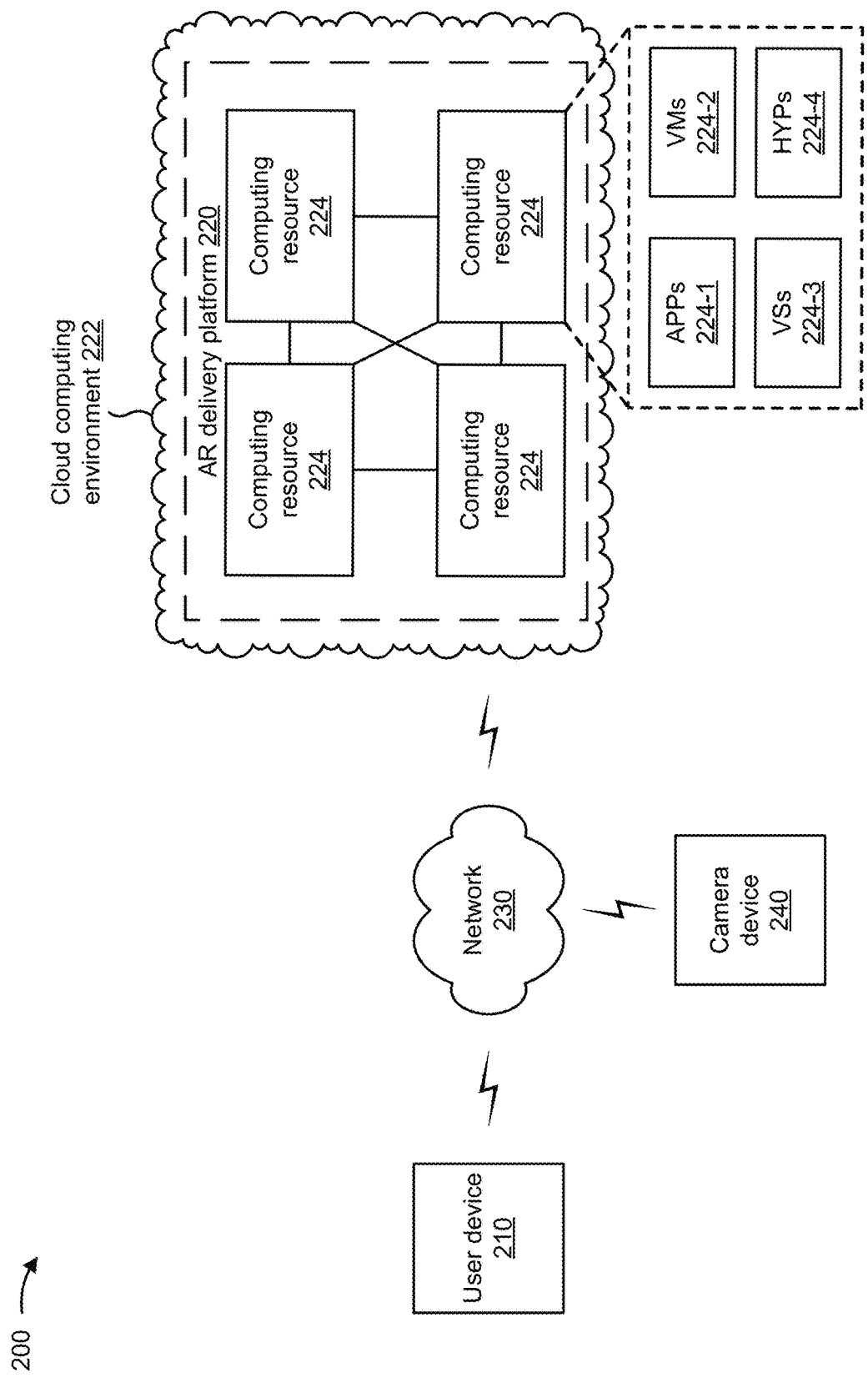
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user device 210, an AR delivery platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to AR delivery platform 220 and/or camera device 240.

AR delivery platform 220 includes one or more devices that may utilize machine learning to generate augmented reality vehicle information for a vehicle captured by cameras in a vehicle lot. In some implementations, AR delivery platform 220 may be modular such that certain software components may be swapped in or out depending on a particular need. As such, AR delivery platform 220 may be easily and/or quickly reconfigured for different uses. In some implementations, AR delivery platform 220 may receive information from and/or transmit information to one or more user devices 210 and/or camera devices 240.

In some implementations, as shown, AR delivery platform 220 may be hosted in a cloud computing environment 222. Notably, while implementations described herein describe AR delivery platform 220 as being hosted in cloud computing environment 222, in some implementations, AR delivery platform 220 may be non-cloud-based (i.e., may be implemented outside of a cloud computing environment) or may be partially cloud-based.

Cloud computing environment 222 includes an environment that may host AR delivery platform 220. Cloud computing environment 222 may provide computation, software, data access, storage, etc. services that do not require end-user knowledge of a physical location and configuration of system(s) and/or device(s) that host AR delivery platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host AR delivery platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with AR delivery platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of user device 210 and/or camera device 240 or an operator of AR delivery platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Camera device 240 includes one or more devices capable of receiving, generating, storing, processing, and/or providing information, such as information described herein. For example, camera device 240 may include a user device (e.g., user device 210), an image and/or video capturing device, a 360-degree camera, a robot equipped with a camera, an unmanned aerial vehicle (UAV) equipped with a camera, or a similar type of device. In some implementations, camera device 240 may receive information from and/or transmit information to user device 210 and/or AR delivery platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
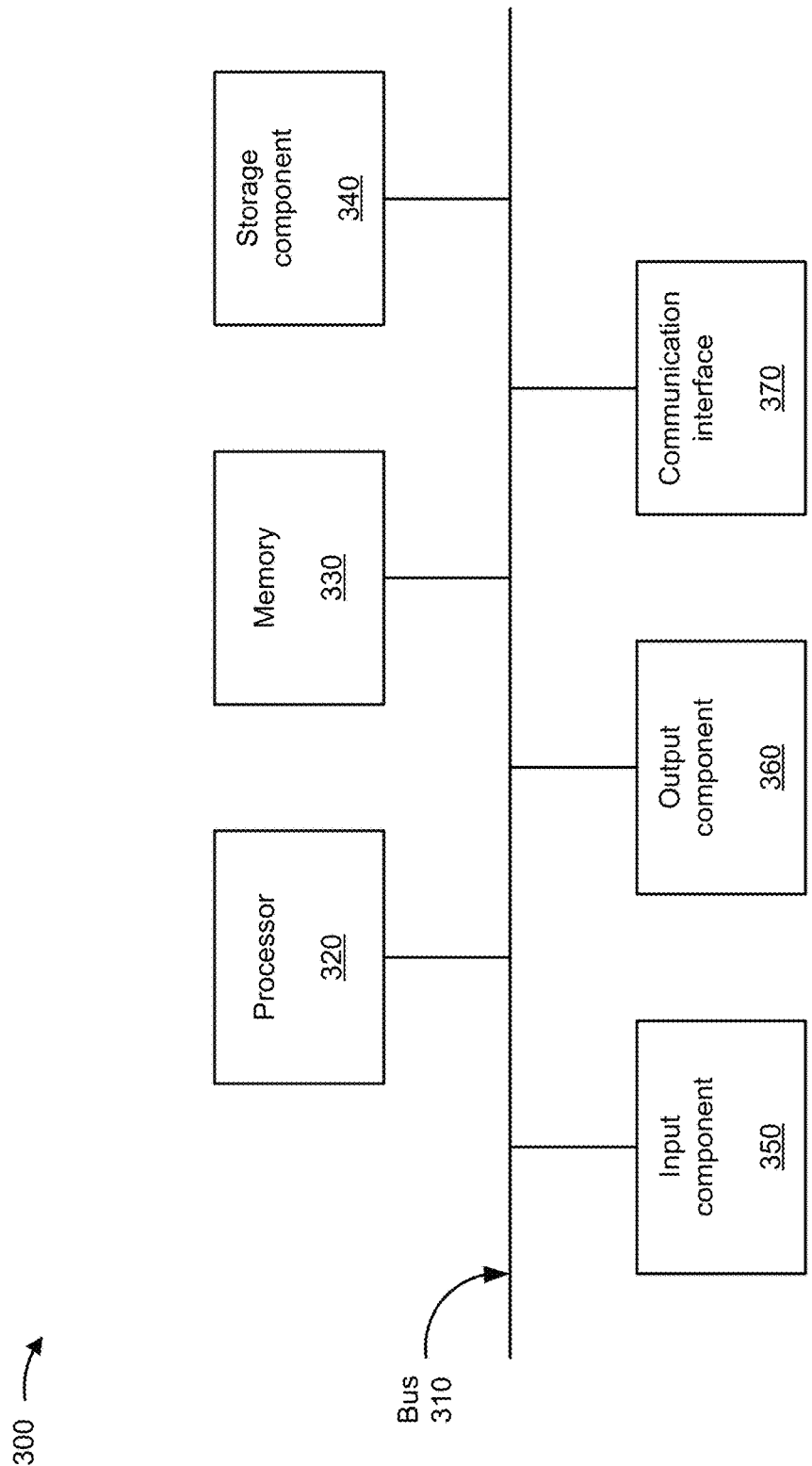
FIG. 3 is a diagram of example components of one or more devices of FIG. 2.

FIG. 3 is a diagram of example components of a device 300. Device 300 may correspond to user device 210, AR delivery platform 220, computing resource 224, and/or camera device 240. In some implementations, user device 210, AR delivery platform 220, computing resource 224, and/or camera device 240 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
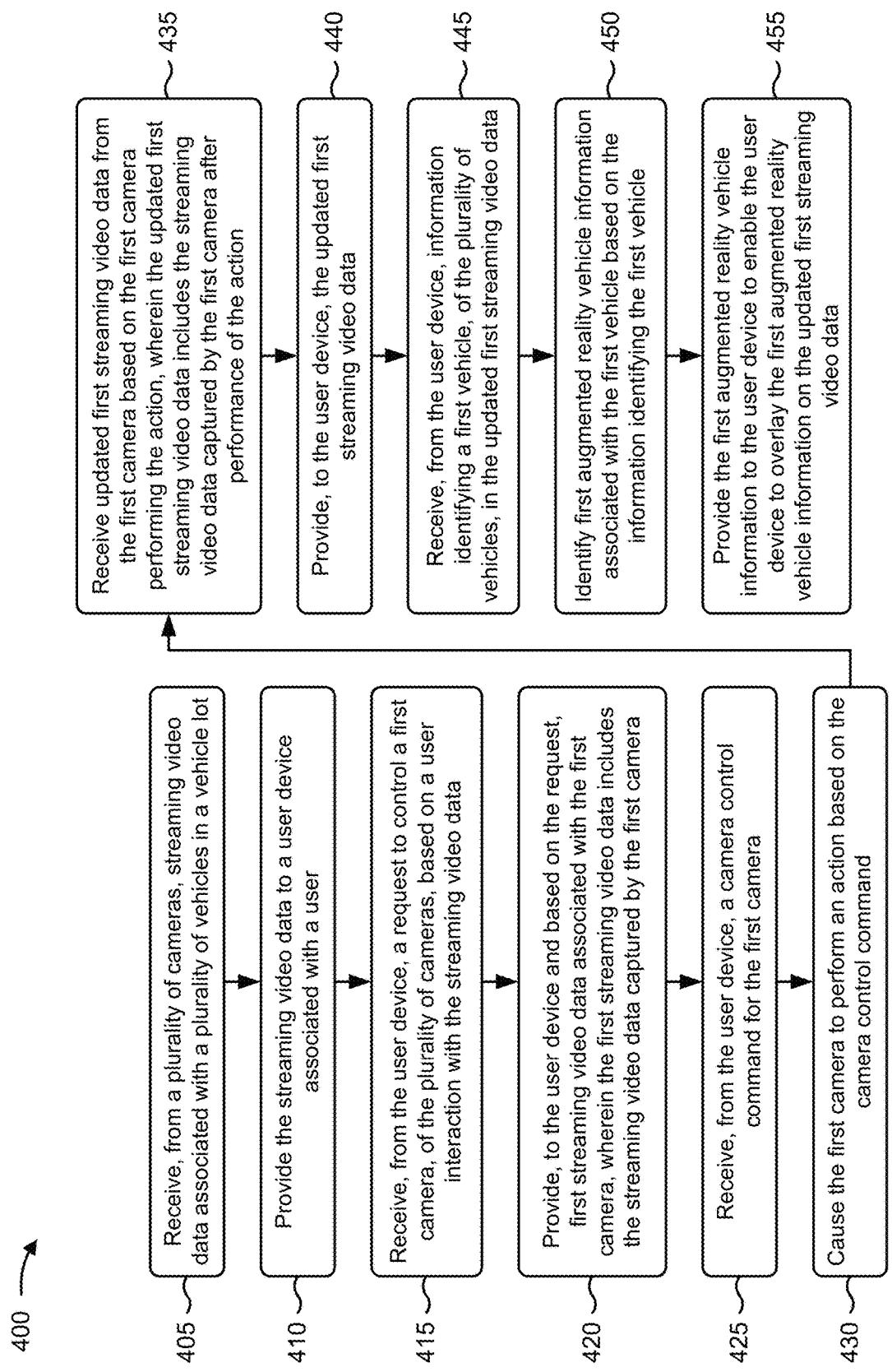

FIG. 4 is a flow chart of an example process 400 for utilizing machine learning to generate augmented reality vehicle information for a vehicle captured by cameras in a vehicle lot. In some implementations, one or more process blocks of FIG. 4 may be performed by an AR delivery platform (e.g., AR delivery platform 220). In some implementations, one or more process blocks of FIG. 4 may be performed by another device or a group of devices separate from or including the AR delivery platform, such as a user device (e.g., user device 210) and/or a camera device (e.g., camera device 240).

As shown in FIG. 4, process 400 may include receiving, from a plurality of cameras, streaming video data associated with a plurality of vehicles in a vehicle lot (block 405). For example, the AR delivery platform (e.g., using computing resource 224, processor 320, communication interface 370, and/or the like) may receive, from a plurality of cameras, streaming video data associated with a plurality of vehicles in a vehicle lot, as described above in connection with FIGS. 1A-2.

As further shown in FIG. 4, process 400 may include providing the streaming video data to a user device associated with a user (block 410). For example, the AR delivery platform (e.g., using computing resource 224, processor 320, communication interface 370, and/or the like) may provide the streaming video data to a user device associated with a user, as described above in connection with FIGS. 1A-2.

As further shown in FIG. 4, process 400 may include receiving, from the user device, a request to control a first camera, of the plurality of cameras, based on a user interaction with the streaming video data (block 415). For example, the AR delivery platform (e.g., using computing resource 224, processor 320, memory 330, communication interface 370, and/or the like) may receive, from the user device, a request to control a first camera, of the plurality of cameras, based on a user interaction with the streaming video data, as described above in connection with FIGS. 1A-2.

As further shown in FIG. 4, process 400 may include providing, to the user device, and based on the request, first streaming video data associated with the first camera, wherein the first streaming video data includes the streaming video data captured by the first camera (block 420). For example, the AR delivery platform (e.g., using computing resource 224, processor 320, storage component 340, communication interface 370, and/or the like) may provide, to the user device, and based on the request, first streaming video data associated with the first camera, as described above in connection with FIGS. 1A-2. In some implementations, the first streaming video data may include the streaming video data captured by the first camera.

As further shown in FIG. 4, process 400 may include receiving, from the user device, a camera control command for the first camera (block 425). For example, the AR delivery platform (e.g., using computing resource 224, processor 320, communication interface 370, and/or the like) may receive, from the user device, a camera control command for the first camera, as described above in connection with FIGS. 1A-2.

As further shown in FIG. 4, process 400 may include causing the first camera to perform an action based on the camera control command (block 430). For example, the AR delivery platform (e.g., using computing resource 224, processor 320, memory 330, communication interface 370, and/or the like) may cause the first camera to perform an action based on the camera control command, as described above in connection with FIGS. 1A-2.

As further shown in FIG. 4, process 400 may include receiving updated first streaming video data from the first camera based on the first camera performing the action, wherein the updated first streaming video data includes the streaming video data captured by the first camera after performance of the action (block 435). For example, the AR delivery platform (e.g., using computing resource 224, processor 320, communication interface 370, and/or the like) may receive updated first streaming video data from the first camera based on the first camera performing the action, as described above in connection with FIGS. 1A-2. In some implementations, the updated first streaming video data may include the streaming video data captured by the first camera after performance of the action.

As further shown in FIG. 4, process 400 may include providing, to the user device, the updated first streaming video data (block 440). For example, the AR delivery platform (e.g., using computing resource 224, processor 320, communication interface 370, and/or the like) may provide, to the user device, the updated first streaming video data, as described above in connection with FIGS. 1A-2.

As further shown in FIG. 4, process 400 may include receiving, from the user device, information identifying a first vehicle, of the plurality of vehicles, in the updated first streaming video data (block 445). For example, the AR delivery platform (e.g., using computing resource 224, processor 320, memory 330, communication interface 370, and/or the like) may receive, from the user device, information identifying a first vehicle, of the plurality of vehicles, in the updated first streaming video data, as described above in connection with FIGS. 1A-2.

As further shown in FIG. 4, process 400 may include identifying first augmented reality vehicle information associated with the first vehicle based on the information identifying the first vehicle (block 450). For example, the AR delivery platform (e.g., using computing resource 224, processor 320, memory 330, and/or the like) may identify first augmented reality vehicle information associated with the first vehicle based on the information identifying the first vehicle, as described above in connection with FIGS. 1A-2.

As further shown in FIG. 4, process 400 may include providing the first augmented reality vehicle information to the user device to enable the user device to overlay the first augmented reality vehicle information on the updated first streaming video data (block 455). For example, the AR delivery platform (e.g., using computing resource 224, processor 320, storage component 340, communication interface 370, and/or the like) may provide the first augmented reality vehicle information to the user device to enable the user device to overlay the first augmented reality vehicle information on the updated first streaming video data, as described above in connection with FIGS. 1A-2.

Process 400 may include additional implementations, such as any single implementation or any combination of implementations described below and/or described with regard to any other process described herein.

In some implementations, the AR delivery platform may determine an inventory of the plurality of vehicles in the vehicle lot based on the streaming video data associated with the plurality of vehicles in the vehicle lot and may utilize information indicating the inventory of the plurality of vehicles to determine augmented reality vehicle information for each of the plurality of vehicles.

In some implementations, when identifying the first augmented reality vehicle information, the AR delivery platform may process the information identifying the first vehicle, with a machine learning model, to match the information identifying the first vehicle and a portion of augmented reality vehicle information associated with the plurality of vehicles, and may identify the first augmented reality vehicle information based on matching the information identifying the first vehicle and the portion of the augmented reality vehicle information associated with the plurality of vehicles.

In some implementations, the AR delivery platform may receive, from the user device, information requesting a communication with a sales person at the vehicle lot and may cause the communication to be established between the user device associated with the user and a user device associated with the sales person. In some implementations, the AR delivery platform may receive, from the user device, another request to control a second camera, of the plurality of cameras, based on another user interaction with the streaming video data, and may provide, to the user device and based on the other request, second streaming video data associated with the second camera, where the second streaming video data includes the streaming video data captured by the second camera.

In some implementations, the AR delivery platform may receive, from the user device, another camera control command for the second camera, may cause the second camera to perform another action based on the other camera control command, may receive updated second streaming video data from the second camera based on the second camera performing the other action, where the updated second streaming video data includes the streaming video data captured by the second camera after performance of the other action, and may provide, to the user device, the updated second streaming video data.

In some implementations, the AR delivery platform may receive, from the user device, information identifying a second vehicle, of the plurality of vehicles, in the updated second streaming video data, may identify second augmented reality vehicle information associated with the second vehicle based on the information identifying the second vehicle, and may provide the second augmented reality vehicle information to the user device to enable the user device to associate the second augmented reality vehicle information with the updated second streaming video data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
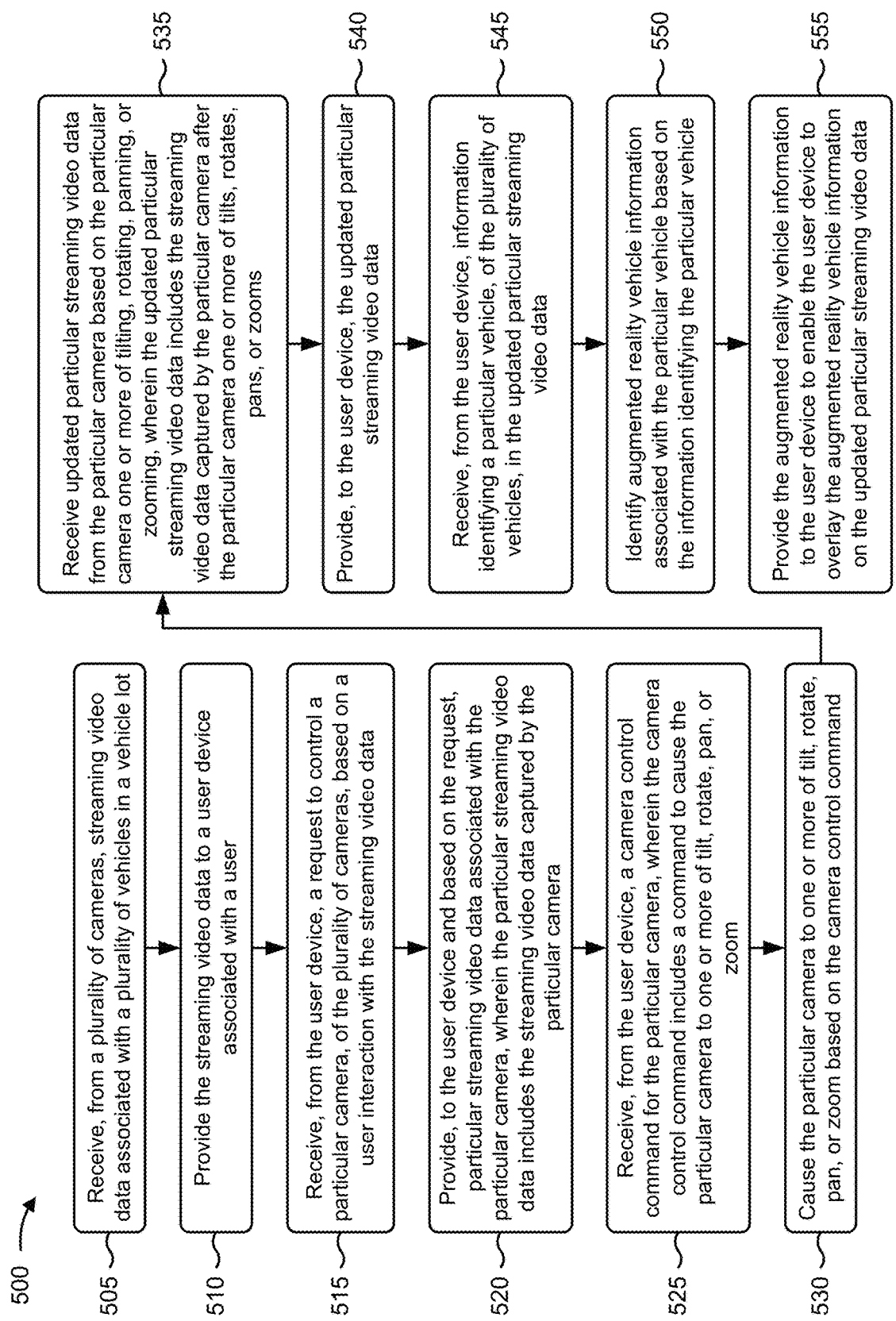

FIG. 5 is a flow chart of an example process 500 for utilizing machine learning to generate augmented reality vehicle information for a vehicle captured by cameras in a vehicle lot. In some implementations, one or more process blocks of FIG. 5 may be performed by an AR delivery platform (e.g., AR delivery platform 220). In some implementations, one or more process blocks of FIG. 5 may be performed by another device or a group of devices separate from or including the AR delivery platform, such as a user device (e.g., user device 210) and/or a camera device (e.g., camera device 240).

As shown in FIG. 5, process 500 may include receiving, from a plurality of cameras, streaming video data associated with a plurality of vehicles in a vehicle lot (block 505). For example, the AR delivery platform (e.g., using computing resource 224, processor 320, communication interface 370, and/or the like) may receive, from a plurality of cameras, streaming video data associated with a plurality of vehicles in a vehicle lot, as described above in connection with FIGS. 1A-2.

As further shown in FIG. 5, process 500 may include providing the streaming video data to a user device associated with a user (block 510). For example, the AR delivery platform (e.g., using computing resource 224, processor 320, storage component 340, communication interface 370, and/or the like) may provide the streaming video data to a user device associated with a user, as described above in connection with FIGS. 1A-2.

As further shown in FIG. 5, process 500 may include receiving, from the user device, a request to control a particular camera, of the plurality of cameras, based on a user interaction with the streaming video data (block 515). For example, the AR delivery platform (e.g., using computing resource 224, processor 320, memory 330, communication interface 370, and/or the like) may receive, from the user device, a request to control a particular camera, of the plurality of cameras, based on a user interaction with the streaming video data, as described above in connection with FIGS. 1A-2.

As further shown in FIG. 5, process 500 may include providing, to the user device and based on the request, particular streaming video data associated with the particular camera, wherein the particular streaming video data includes the streaming video data captured by the particular camera (block 520). For example, the AR delivery platform (e.g., using computing resource 224, processor 320, communication interface 370, and/or the like) may provide, to the user device and based on the request, particular streaming video data associated with the particular camera, as described above in connection with FIGS. 1A-2. In some implementations, the particular streaming video data may include the streaming video data captured by the particular camera.

As further shown in FIG. 5, process 500 may include receiving, from the user device, a camera control command for the particular camera, wherein the camera control command includes a command to cause the particular camera to one or more of tilt, rotate, pan, or zoom (block 525). For example, the AR delivery platform (e.g., using computing resource 224, processor 320, communication interface 370, and/or the like) may receive, from the user device, a camera control command for the particular camera, wherein the camera control command includes a command to cause the particular camera to one or more of tilt, rotate, pan, or zoom, as described above in connection with FIGS. 1A-2.

As further shown in FIG. 5, process 500 may include causing the particular camera to one or more of tilt, rotate, pan, or zoom based on the camera control command (block 530). For example, the AR delivery platform (e.g., using computing resource 224, processor 320, memory 330, communication interface 370, and/or the like) may cause the particular camera to one or more of tilt, rotate, pan, or zoom based on the camera control command, as described above in connection with FIGS. 1A-2.

As further shown in FIG. 5, process 500 may include receiving updated particular streaming video data from the particular camera based on the particular camera one or more of tilting, rotating, panning, or zooming, wherein the updated particular streaming video data includes the streaming video data captured by the particular camera after the particular camera one or more of tilts, rotates, pans, or zooms (block 535). For example, the AR delivery platform (e.g., using computing resource 224, processor 320, storage component 340, communication interface 370, and/or the like) may receive updated particular streaming video data from the particular camera based on the particular camera one or more of tilting, rotating, panning, or zooming, as described above in connection with FIGS. 1A-2. In some implementations, the updated particular streaming video data may include the streaming video data captured by the particular camera after the particular camera one or more of tilts, rotates, pans, or zooms.

As further shown in FIG. 5, process 500 may include providing, to the user device, the updated particular streaming video data (block 540). For example, the AR delivery platform (e.g., using computing resource 224, processor 320, communication interface 370, and/or the like) may provide, to the user device, the updated particular streaming video data, as described above in connection with FIGS. 1A-2.

As further shown in FIG. 5, process 500 may include receiving, from the user device, information identifying a particular vehicle, of the plurality of vehicles, in the updated particular streaming video data (block 545). For example, the AR delivery platform (e.g., using computing resource 224, processor 320, memory 330, communication interface 370, and/or the like) may receive, from the user device, information identifying a particular vehicle, of the plurality of vehicles, in the updated particular streaming video data, as described above in connection with FIGS. 1A-2.

As further shown in FIG. 5, process 500 may include identifying augmented reality vehicle information associated with the particular vehicle based on the information identifying the particular vehicle (block 550). For example, the AR delivery platform (e.g., using computing resource 224, processor 320, memory 330, and/or the like) may identify augmented reality vehicle information associated with the particular vehicle based on the information identifying the particular vehicle, as described above in connection with FIGS. 1A-2.

As further shown in FIG. 5, process 500 may include providing the augmented reality vehicle information to the user device to enable the user device to overlay the augmented reality vehicle information on the updated particular streaming video data (block 555). For example, the AR delivery platform (e.g., using computing resource 224, processor 320, storage component 340, communication interface 370, and/or the like) may provide the augmented reality vehicle information to the user device to enable the user device to overlay the augmented reality vehicle information on the updated particular streaming video data, as described above in connection with FIGS. 1A-2.

Process 500 may include additional implementations, such as any single implementation or any combination of implementations described below and/or described with regard to any other process described herein.

In some implementations, the augmented reality vehicle information may include information indicating a make of the particular vehicle, a model of the particular vehicle, a year of the particular vehicle, mileage of the particular vehicle, miles per gallon of the particular vehicle, a cost of the particular vehicle, financing options for the particular vehicle, features of the particular vehicle (e.g., color, trim, safety features, and/or the like), and/or an accident history associated with the particular vehicle.

In some implementations, the AR delivery platform may determine an inventory of the plurality of vehicles in the vehicle lot based on the streaming video data associated with the plurality of vehicles in the vehicle lot, may determine whether information indicating the inventory of the plurality of vehicles matches historical inventory information, and may generate a notification when the information indicating the inventory of the plurality of vehicles fails to match the historical inventory information.

In some implementations, when identifying the augmented reality vehicle information, the AR delivery platform may process the information identifying the particular vehicle, with a machine learning model, to match the information identifying the particular vehicle and a portion of augmented reality vehicle information associated with the plurality of vehicles, and may identify the augmented reality vehicle information based on matching the information identifying the particular vehicle and the portion of the augmented reality vehicle information associated with the plurality of vehicles.

In some implementations, the AR delivery platform may receive information requesting a communication with a sales person at the vehicle lot and may cause the communication to be established between the user device associated with the user and a user device associated with the sales person.

In some implementations, the AR delivery platform may receive, from the user device, another camera control command for the particular camera, may cause the particular camera to perform an action based on the other camera control command, may receive further updated particular streaming video data from the particular camera based on the particular camera performing the action, where the further updated particular streaming video data includes the streaming video data captured by the particular camera after performance of the action, and may provide, to the user device, the further updated particular streaming video data.

In some implementations, the plurality of cameras may include a camera, a 360-degree camera, a robot equipped with a camera, another user device equipped with a camera, and/or an unmanned aerial vehicle (UAV) equipped with a camera.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing machine learning to generate augmented reality vehicle information for a vehicle captured by cameras in a vehicle lot. In some implementations, one or more process blocks of FIG. 6 may be performed by an AR delivery platform (e.g., AR delivery platform 220). In some implementations, one or more process blocks of FIG. 6 may be performed by another device or a group of devices separate from or including the AR delivery platform, such as a user device (e.g., user device 210) and/or a camera device (e.g., camera device 240).

As shown in FIG. 6, process 600 may include receiving, from a plurality of cameras, streaming video data associated with a plurality of vehicles in a vehicle lot (block 605). For example, the AR delivery platform (e.g., using computing resource 224, processor 320, input component 350, communication interface 370, and/or the like) may receive, from a plurality of cameras, streaming video data associated with a plurality of vehicles in a vehicle lot, as described above in connection with FIGS. 1A-2.

As further shown in FIG. 6, process 600 may include providing the streaming video data to a user device associated with a user (block 610). For example, the AR delivery platform (e.g., using computing resource 224, processor 320, storage component 340, communication interface 370, and/or the like) may provide the streaming video data to a user device associated with a user, as described above in connection with FIGS. 1A-2.

As further shown in FIG. 6, process 600 may include receiving, from the user device, a selection of a first camera of the plurality of cameras (block 615). For example, the AR delivery platform (e.g., using computing resource 224, processor 320, memory 330, communication interface 370, and/or the like) may receive, from the user device, a selection of a first camera of the plurality of cameras, as described above in connection with FIGS. 1A-2.

As further shown in FIG. 6, process 600 may include providing, to the user device and based on the selection, first streaming video data captured by the first camera (block 620). For example, the AR delivery platform (e.g., using computing resource 224, processor 320, output component 360, communication interface 370, and/or the like) may provide, to the user device and based on the selection, first streaming video data captured by the first camera, as described above in connection with FIGS. 1A-2.

As further shown in FIG. 6, process 600 may include receiving, from the user device, a camera control command for the first camera (block 625). For example, the AR delivery platform (e.g., using computing resource 224, processor 320, input component 350, communication interface 370, and/or the like) may receive, from the user device, a camera control command for the first camera, as described above in connection with FIGS. 1A-2.

As further shown in FIG. 6, process 600 may include causing the first camera to perform an action based on the camera control command (block 630). For example, the AR delivery platform (e.g., using computing resource 224, processor 320, memory 330, communication interface 370, and/or the like) may cause the first camera to perform an action based on the camera control command, as described above in connection with FIGS. 1A-2.

As further shown in FIG. 6, process 600 may include receiving updated first streaming video data from the first camera based on the first camera performing the action, wherein the updated first streaming video data includes the first streaming video data captured by the first camera after performance of the action (block 635). For example, the AR delivery platform (e.g., using computing resource 224, processor 320, input component 350, communication interface 370, and/or the like) may receive updated first streaming video data from the first camera based on the first camera performing the action, as described above in connection with FIGS. 1A-2. In some implementations, the updated first streaming video data may include the first streaming video data captured by the first camera after performance of the action.

As further shown in FIG. 6, process 600 may include providing, to the user device, the updated first streaming video data (block 640). For example, the AR delivery platform (e.g., using computing resource 224, processor 320, output component 360, communication interface 370, and/or the like) may provide, to the user device, the updated first streaming video data, as described above in connection with FIGS. 1A-2.

As further shown in FIG. 6, process 600 may include receiving, from the user device, information identifying a vehicle, of the plurality of vehicles, in the updated first streaming video data (block 645). For example, the AR delivery platform (e.g., using computing resource 224, processor 320, input component 350, communication interface 370, and/or the like) may receive, from the user device, information identifying a vehicle, of the plurality of vehicles, in the updated first streaming video data, as described above in connection with FIGS. 1A-2.

As further shown in FIG. 6, process 600 may include identifying augmented reality vehicle information associated with the vehicle based on the information identifying the vehicle, wherein the augmented reality vehicle information includes information indicating one or more of a make of the vehicle, a model of the vehicle, a year of the vehicle, mileage of the vehicle, miles per gallon of the vehicle, a cost of the vehicle, financing options for the vehicle, or an accident history associated with the vehicle (block 650). For example, the AR delivery platform (e.g., using computing resource 224, processor 320, memory 330, storage component 340, and/or the like) may identify augmented reality vehicle information associated with the vehicle based on the information identifying the vehicle, as described above in connection with FIGS. 1A-2. In some implementations, the augmented reality vehicle information may include information indicating a make of the vehicle, a model of the vehicle, a year of the vehicle, mileage of the vehicle, miles per gallon of the vehicle, a cost of the vehicle, financing options for the vehicle, and/or an accident history associated with the vehicle.

As further shown in FIG. 6, process 600 may include providing the augmented reality vehicle information to the user device to enable the user device to overlay the augmented reality vehicle information on the updated first streaming video data (block 655). For example, the AR delivery platform (e.g., using computing resource 224, processor 320, output component 360, communication interface 370, and/or the like) may provide the augmented reality vehicle information to the user device to enable the user device to overlay the augmented reality vehicle information on the updated first streaming video data, as described above in connection with FIGS. 1A-2.

Process 600 may include additional implementations, such as any single implementation or any combination of implementations described below and/or described with regard to any other process described herein.

In some implementations, when identifying the augmented reality vehicle information, the AR delivery platform may process the information identifying the vehicle, with a machine learning model, to match the information identifying the vehicle and a portion of augmented reality vehicle information associated with the plurality of vehicles, and may identify the augmented reality vehicle information based on matching the information identifying the vehicle and the portion of the augmented reality vehicle information associated with the plurality of vehicles.

In some implementations, the AR delivery platform may receive, from the user device, information requesting a communication with a sales person at the vehicle lot and may cause the communication to be established between the user device associated with the user and a user device associated with the sales person. In some implementations, the AR delivery platform may receive, from the user device, another selection of a second camera of the plurality of cameras, and may provide, to the user device and based on the other selection, second streaming video data captured by the second camera.

In some implementations, the AR delivery platform may receive, from the user device, another camera control command for the second camera, may cause the second camera to perform another action based on the other camera control command, may receive updated second streaming video data from the second camera based on the second camera performing the other action, where the updated second streaming video data includes the streaming video data captured by the second camera after performance of the other action, and may provide, to the user device, the updated second streaming video data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    determining, by a device, an inventory of a plurality of vehicles in a vehicle lot based on first streaming video data received from a plurality of cameras associated with the vehicle lot,
        wherein the plurality of cameras includes a first camera equipped to an unmanned aerial vehicle (UAV);
    determining, by the device and using the first streaming video data, a condition of each vehicle of the plurality of vehicles;
    receiving, by the device and from the plurality of cameras, second streaming video data associated with the plurality of vehicles,
        the plurality of cameras providing respective portions of the second streaming video data;
    providing, by the device, the second streaming video data to a user device associated with a user;
    receiving, by the device and from the user device, a request to control the first camera, of the plurality of cameras, based on a user interaction with the second streaming video data;
    providing, by the device, to the user device, and based on the request, third streaming video data associated with the first camera,
        wherein the third streaming video data includes a respective portion of the second streaming video data captured by the first camera;
    receiving, by the device and from the user device, a camera control command for the first camera;
    causing, by the device, the UAV to perform an action based on the camera control command,
        the action including moving the UAV;
    receiving, by the device, updated third streaming video data from the first camera based on the first camera performing the action,
        wherein the updated third streaming video data includes the respective portion of the second streaming video data captured by the first camera after performance of the action;
    providing, by the device and to the user device, the updated third streaming video data;
    receiving, by the device and from the user device, information identifying a first vehicle, of the plurality of vehicles, in the updated third streaming video data;
    identifying, by the device, first augmented reality vehicle information associated with the first vehicle based on the information identifying the first vehicle,
        the first augmented reality vehicle information including data identifying the condition of the first vehicle; and
    providing, by the device, the first augmented reality vehicle information to the user device to enable the user device to overlay the first augmented reality vehicle information on the updated third streaming video data.

2. The method of claim 1, further comprising:
    utilizing information indicating the inventory of the plurality of vehicles to determine augmented reality vehicle information for each of the plurality of vehicles.

3. The method of claim 1, wherein identifying the first augmented reality vehicle information comprises:
    processing the information identifying the first vehicle, with a machine learning model, to match the information identifying the first vehicle and a portion of augmented reality vehicle information associated with the plurality of vehicles; and
    identifying the first augmented reality vehicle information based on matching the information identifying the first vehicle and the portion of the augmented reality vehicle information associated with the plurality of vehicles.

4. The method of claim 1, further comprising:
    receiving, from the user device, information requesting a communication with a sales person at the vehicle lot; and
    causing the communication to be established between the user device associated with the user and a user device associated with the sales person.

5. The method of claim 1, further comprising:
receiving, from the user device, another request to control a second camera, of the plurality of cameras, based on another user interaction with the second streaming video data; and
providing, to the user device and based on the other request, fourth streaming video data associated with the second camera,
wherein the fourth streaming video data includes a respective portion of the second streaming video data captured by the second camera.

6. The method of claim 5, further comprising:
receiving, from the user device, another camera control command for the second camera;
causing the second camera to perform another action based on the other camera control command,
the other action including moving the second camera;
receiving updated fourth streaming video data from the second camera based on the second camera performing the other action,
wherein the updated fourth streaming video data includes the respective portion of the second streaming video data captured by the second camera after performance of the other action; and
providing, to the user device, the updated fourth streaming video data.

7. The method of claim 6, further comprising:
receiving, from the user device, information identifying a second vehicle, of the plurality of vehicles, in the updated fourth streaming video data;
identifying second augmented reality vehicle information associated with the second vehicle based on the information identifying the second vehicle; and
providing the second augmented reality vehicle information to the user device to enable the user device to associate the second augmented reality vehicle information with the updated fourth streaming video data.

8. A device, comprising:
one or more memories; and
one or more processors, communicatively coupled to the one or more memories, configured to:
determine an inventory of a plurality of vehicles in a vehicle lot based on first streaming video data received from a plurality of cameras associated with the vehicle lot,
wherein the plurality of cameras includes a particular camera, of the plurality of cameras, equipped to an unmanned aerial vehicle (UAV);
receive, from the plurality of cameras, second streaming video data associated with the plurality of vehicles,
the plurality of cameras providing respective portions of the second streaming video data;
receive, from a user device associated with a user, user input indicating a particular vehicle, of the plurality of vehicles;
provide, based on the user input, the second streaming video data to the user device,
the second streaming video data depicting the particular vehicle;
receive, from the user device, a request to control the particular camera based on a user interaction with the second streaming video data;
provide, to the user device and based on the request, particular streaming video data associated with the particular camera,
wherein the particular streaming video data includes a respective portion of the second streaming video data captured by the particular camera, and
wherein the particular streaming video data includes information identifying the particular vehicle;
receive, from the user device, a camera control command for the particular camera,
wherein the camera control command includes a command to cause the particular camera to one or more of tilt, rotate, pan, or zoom;
cause the UAV to move based on the camera control command;
receive updated particular streaming video data from the particular camera based on the particular camera one or more of tilting, rotating, panning, or zooming,
wherein the updated particular streaming video data includes the respective portion of the second streaming video data captured by the particular camera after the particular camera one or more of tilts, rotates, pans, or zooms;
provide, to the user device, the updated particular streaming video data;
identify augmented reality vehicle information associated with the particular vehicle based on the information identifying the particular vehicle,
the augmented reality vehicle information including data identifying the particular vehicle; and
provide the augmented reality vehicle information to the user device to enable the user device to overlay the augmented reality vehicle information on the updated particular streaming video data.

9. The device of claim 8, wherein the augmented reality vehicle information further includes information indicating one or more of:
a make of the particular vehicle,
a model of the particular vehicle,
a year of the particular vehicle,
mileage of the particular vehicle,
miles per gallon of the particular vehicle,
a cost of the particular vehicle,
financing options for the particular vehicle, or
an accident history associated with the particular vehicle.

10. The device of claim 8, wherein the one or more processors are further configured to:
determine, using the first streaming video data, a condition and location of each vehicle of the plurality of vehicles;
determine whether the condition and the location match historical inventory information regarding the plurality of vehicles,
wherein the historical inventory information is maintained by an inventory management system associated with the vehicle lot; and
generate a notification based on determining that the condition and the location do not match the historical inventory information.

11. The device of claim 8, wherein, when identifying the augmented reality vehicle information, the one or more processors are configured to:
process the information identifying the particular vehicle, with a machine learning model, to match the information identifying the particular vehicle and a portion of augmented reality vehicle information associated with the plurality of vehicles; and
identify the augmented reality vehicle information based on matching the information identifying the particular vehicle and the portion of the augmented reality vehicle information associated with the plurality of vehicles.

12. The device of claim 8, wherein the one or more processors are further configured to:
   receive information requesting a communication with a sales person at the vehicle lot; and
   cause the communication to be established between the user device associated with the user and a user device associated with the sales person.

13. The device of claim 8, wherein the one or more processors are further configured to:
   receive, from the user device, another camera control command for the particular camera;
   cause the UAV to perform an action based on the other camera control command,
      the action including moving the UAV;
   receive further updated particular streaming video data from the particular camera based on the UAV performing the action,
      wherein the further updated particular streaming video data includes the respective portion of the second streaming video data captured by the particular camera after performance of the action; and
   provide, to the user device, the further updated particular streaming video data.

14. The device of claim 13, wherein the plurality of cameras includes one or more of:
   a three-hundred and sixty degrees camera,
   a robot equipped with a camera, or
   another user device equipped with a camera.

15. A non-transitory computer-readable medium storing instructions, the instructions comprising:
   one or more instructions that, when executed by one or more processors of a device, cause the one or more processors to:
      receive, from a plurality of cameras associated with a vehicle lot, first streaming video data associated with a plurality of vehicles in the vehicle lot,
         wherein the plurality of cameras includes a first camera equipped to an unmanned aerial vehicle (UAV;
      determine, using the first streaming video data, a condition of each vehicle of the plurality of vehicles;
      receive, from the plurality of cameras, second streaming video data associated with the plurality of vehicles,
         the plurality of cameras providing respective portions of the second streaming video data;
      receive, from a user device associated with a user, user input indicating a particular vehicle, of the plurality of vehicles;
      provide, based on the user input, the second streaming video data to the user device,
         the second streaming video data depicting the particular vehicle;
      receive, from the user device, a selection of the first camera from the plurality of cameras;
      provide, to the user device and based on the selection, third streaming video data captured by the first camera,
         wherein the third streaming video data includes a respective portion of the second streaming video data captured by the first camera;
      receive, from the user device, a camera control command for the first camera;
      cause the UAV to perform an action based on the camera control command,
         the action including moving the UAV;
      receive updated third streaming video data from the first camera based on the first camera performing the action,
         wherein the updated third streaming video data includes the respective portion of the second streaming video data captured by the first camera after performance of the action, and
         the updated third streaming video data includes information identifying the particular vehicle;
      provide, to the user device, the updated third streaming video data;
      identify augmented reality vehicle information associated with the particular vehicle based on the information identifying the particular vehicle,
         wherein the augmented reality vehicle information includes:
            data identifying a location of the particular vehicle, the condition of the particular vehicle, and
            information indicating one or more of:
               a make of the particular vehicle,
               a model of the particular vehicle,
               a year of the particular vehicle,
               mileage of the particular vehicle,
               miles per gallon of the particular vehicle,
               a cost of the particular vehicle,
               financing options for the particular vehicle, or
               an accident history associated with the particular vehicle; and
      provide the augmented reality vehicle information to the user device to enable the user device to overlay the augmented reality vehicle information on the updated third streaming video data.

16. The non-transitory computer-readable medium of claim 15, wherein the instructions further comprise:
   one or more instructions that, when executed by the one or more processors, cause the one or more processors to:
      utilize information indicating an inventory of the plurality of vehicles to determine augmented reality vehicle information for each of the plurality of vehicles.

17. The non-transitory computer-readable medium of claim 15, wherein the one or more instructions, that cause the one or more processors to identify the augmented reality vehicle information, cause the one or more processors to:
   process the information identifying the particular vehicle, with a machine learning model, to match the information identifying the particular vehicle and a portion of augmented reality vehicle information associated with the plurality of vehicles; and
   identify the augmented reality vehicle information based on matching the information identifying the particular vehicle and the portion of the augmented reality vehicle information associated with the plurality of vehicles.

18. The non-transitory computer-readable medium of claim 15, wherein the instructions further comprise:
one or more instructions that, when executed by the one or more processors, cause the one or more processors to:
receive, from the user device, information requesting a communication with a sales person at the vehicle lot; and
cause the communication to be established between the user device associated with the user and a user device associated with the sales person.

19. The non-transitory computer-readable medium of claim 15, wherein the instructions further comprise:
one or more instructions that, when executed by the one or more processors, cause the one or more processors to:
receive, from the user device, another selection of a second camera of the plurality of cameras; and
provide, to the user device and based on the other selection, fourth streaming video data captured by the second camera,
wherein the fourth streaming video data includes a respective portion of the second streaming video data captured by the second camera.

20. The non-transitory computer-readable medium of claim 19, wherein the instructions further comprise:
one or more instructions that, when executed by the one or more processors, cause the one or more processors to:
receive, from the user device, another camera control command for the second camera;
cause the second camera to perform another action based on the other camera control command,
the other action including moving the second camera;
receive updated fourth streaming video data from the second camera based on the second camera performing the other action,
wherein the updated fourth streaming video data includes the respective portion of the second streaming video data captured by the second camera after performance of the other action; and
provide, to the user device, the updated fourth streaming video data.

* * * * *